(12) United States Patent
Inoue

(10) Patent No.: US 7,158,264 B2
(45) Date of Patent: *Jan. 2, 2007

(54) METHOD OF DETERMINING THRESHOLD ARRAY FOR GENERATING GRADATION IMAGE

(75) Inventor: Yoshiaki Inoue, Odawara (JP)

(73) Assignee: Fuji Photo Film co., Ltd., Kanagawg-ken (JP)

( * ) Notice: Subject to any disclaimer, the term of this patent is extended or adjusted under 35 U.S.C. 154(b) by 997 days.

This patent is subject to a terminal disclaimer.

(21) Appl. No.: 10/166,164

(22) Filed: Jun. 11, 2002

(65) Prior Publication Data

US 2002/0186418 A1 Dec. 12, 2002

(30) Foreign Application Priority Data

Jun. 12, 2001 (JP) ............................ 2001-177333

(51) Int. Cl.
*H04N 1/405* (2006.01)
*H04N 1/409* (2006.01)
*G06T 5/00* (2006.01)

(52) U.S. Cl. ..................... 358/3.14; 358/3.2; 358/3.26; 382/270

(58) Field of Classification Search ................. 358/1.9, 358/3.06, 3.13–3.2, 3.26, 533, 536; 382/237, 382/270, 205, 264

See application file for complete search history.

(56) References Cited

U.S. PATENT DOCUMENTS 5,111,310 A 5/1992 Parker et al.
5,526,438 A * 6/1996 Barton ........................ 382/237
5,825,932 A 10/1998 Inoue
6,172,770 B1 1/2001 Inoue
6,930,801 B1 * 8/2005 Inoue ........................ 358/3.14
2001/0012129 A1 8/2001 Inoue

FOREIGN PATENT DOCUMENTS

| EP | 0 560 285 A1 | 9/1993 |
| EP | 0 907 282 A2 | 4/1999 |
| JP | 8-317212 | 11/1996 |
| JP | 11-112814 | 4/1999 |

OTHER PUBLICATIONS

"Postscript screening" written by Peter Fink, published by MDN corporation on Aug. 11, 1994, 1st edition.

* cited by examiner

*Primary Examiner*—Scott A. Rogers
(74) *Attorney, Agent, or Firm*—Sughrue Mion, PLLC

(57) ABSTRACT

Halftone image data is generated according to a threshold array in which thresholds T up to a given gradation have been determined, and candidate pixels to be blackened are then determined. Then, a low-frequency component extractor extracts low-frequency component data from density image data which simulates the density of the halftone image data corresponding to an output image from an image output apparatus. A particular frequency component divider 70 divides the extracted low-frequency component data into particular frequency component data for intensifying the low-frequency components, and blackening candidate pixels for intensifying the particular frequency components are excluded, thus narrowing down candidate pixels. The positions of thus determined blackening candidate pixels are determined as the positions of thresholds for a next gradation.

7 Claims, 22 Drawing Sheets

FIG. 9
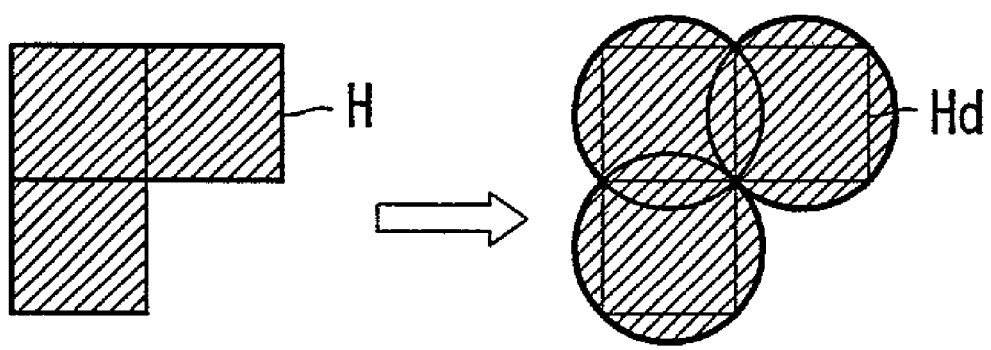
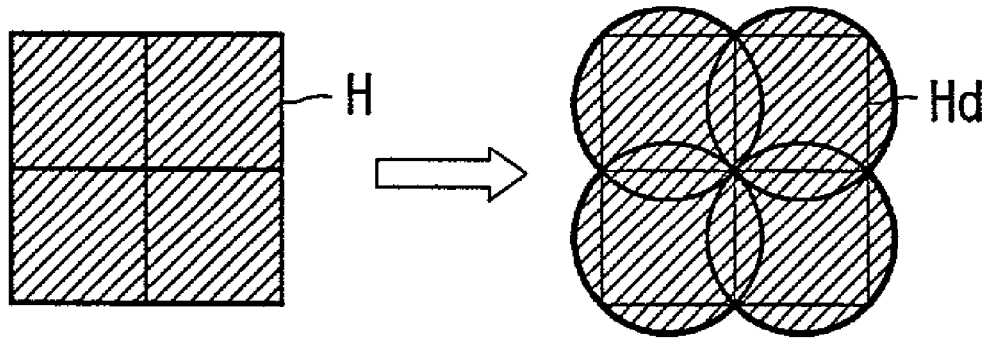

FIG. 18

120 THRESHOLD ARRAY DETERMINING SEQUENCE TABLE

| DETERMINING PATTERN | CONTENTS |
|---|---|
| 1 | 0% ⟶ 100% |
| 2 | 100% ⟶ 0% |
| 3 | 0% ⟶   ⟵ 100% |
| 4 | 0% ⟵ X% ⟶ 100% |
| 5 | 0% ⟶ ⟵ X% ⟶ ⟵ 100% |

METHOD OF DETERMINING THRESHOLD ARRAY FOR GENERATING GRADATION IMAGE

BACKGROUND OF THE INVENTION

1. Field of the Invention

The present invention relates to a method of determining a threshold array for generating a gradation image, suitable for use in apparatus in printing applications, such as a color scanner, an image setter, a CTP (Computer To Plate) apparatus, a CTC (Computer To Cylinder) apparatus, a DDCP (Direct Digital Color Proof) apparatus, or the like.

2. Description of the Related Art

Halftone image output apparatus such as an image setter or the like produce a halftone image (gradation image) of binary pixels (e.g., black and white pixels generated by turning on and off an applied laser beam) on a printing sheet or a film. It has been pointed out that such a halftone image output apparatus suffers moiré patterns generated on outputted images due to the conflict or interference between its output resolution and screen ruling (see Japanese Laid-Open Patent Publication No. 8-317212).

The output resolution refers to the resolution of the image output apparatus, and is defined by dpi (dots per inch), pixels/inch (same as dpi), or pixels/mm (represented by dpmm or lpmm). The screen ruling refers to lines/inch (may be converted into lines/mm) which represents the number of columns of dots (also referred to as dot cells) contained in a unit length (one inch), and is defined by lpi (lines per inch) and also called screen frequency or dot frequency.

A moiré pattern generated due to the interference between an output resolution and a screen ruling is a periodic pattern of dots, i.e., a periodic interference fringe pattern produced between the dot pitch and the scanning line pitch. The moiré pattern serves as a low-frequency noise component and lowers the quality of the produced image.

The inventor of the present application has proposed techniques for reducing such a low-frequency noise component in Japanese Laid-Open Patent Publication No. 11-112814 (hereinafter referred to as "first technique") and Japanese Patent Application No. 2001-28838 (hereinafter referred to as "second technique").

According to the first technique, among existing thresholds to be corrected in a threshold array (also referred to as "threshold template"), a threshold to be corrected is compared with a central value within a given threshold correcting range and converted into dot image data, which is then converted into data in a frequency space. From the data in the frequency space, there is extracted data containing a low-frequency noise component whose frequency is lower than the basic frequency of dots, and the extracted data is converted into image data in an actual space. The converted image data in the actual space and the threshold to be corrected are observed within the given threshold correcting range, and a pair of thresholds to be replaced (basically, a pair of thresholds located in positions for generating pixels having maximum and minimum values of the image data in the actual space) is selected and replaced, thus producing a corrected threshold array.

The corrected threshold array produced by the first technique is resistant to the generation of a low-frequency noise component.

According to the second technique, an existing threshold array is not corrected, but a threshold array is newly generated which makes an outputted gradation image more resistant to moiré. The second technique is high in freedom and has an increased ability to reduce moiré.

The first and second moiré reduction techniques are effective when applied to halftone images having a relatively high resolution of 2400 dpi and a relatively high screen ruling of 175 lpi, for example.

Specifically, the first and second moiré reduction techniques are suitable for being applied to threshold arrays for generating halftone images whose number of pixels per dot (also referred to as dot number which is calculated by $(2400/175)^2$ in the above example, about 188) is relatively large.

Under the conditions of 2400 dpi and 175 lpi, however, apparatus in printing applications, such as a color scanner, an image setter, a CTP apparatus, a CTC apparatus, a DDCP apparatus, etc. can output images of desired quality, but have to process an increased amount of image data and need a long period of time required to process and output image data.

The inventor of the present application has found that under the conditions in which the output resolution and the screen ruling are more liable to interfere with each other, tending to produce moiré (single-plate moiré), e.g., under the output conditions of 1200 dpi and 175 lpi, or generally under the output conditions in which the ratio of the output resolution (dpi)/the screen ruling (lpi) is equal to or smaller than 10, the proportion of one pixel in a dot increases, resulting in a large quantizing error, and moiré tends to remain unremoved even according to the first and second techniques.

Actually, an image outputted under the conditions of 1200 dpi and 175 lpi and an image outputted under the conditions of 2000 dpi and 175 lpi are made up of pixels having respective sizes of about 21 μm and 13 μm which are too small for the human eye to distinguish between their resolutions.

Therefore, if an image outputted under the conditions of 1200 dpi and 175 lpi, which are subject to a greater quantizing error than the conditions of 2000 dpi and 175 lpi, is free of a moiré pattern, then apparatus in printing applications, such as a color scanner, an image setter, a CTP apparatus, a CTC apparatus, a DDCP apparatus, etc. can be made simpler in arrangement and can be operated at higher processing speeds.

SUMMARY OF THE INVENTION

It is therefore an object of the present invention to provide a method of determining a threshold array for generating a gradation image, which is resistant to low-frequency components such as moiré or the like when a gradation image of a relatively low resolution is outputted.

More specifically, if it is assumed for an easier understanding that the density of an input image is uniform, then a moiré pattern is generated in an output image reproduced by a gradation reproducing method based on a process using a threshold array (hereinafter referred to as "threshold process") because a pattern corresponding to the threshold array is repeated. A moiré pattern due to the interference between an output resolution and a screen ruling is considered to be one of threshold-based periodic components in the case where halftone dots are used in the threshold process (a method of reproducing an image where dots having substantially equivalent sizes are arrayed). Therefore, the method according to the present invention serves to reduce a periodic component caused by thresholds produced in all gradation reproducing methods which can employ the threshold process.

According to the present invention, there is provided a method of determining a threshold array for generating a gradation image, comprising the steps of, when the positions of thresholds up to a given gradation have been determined in a threshold array and the position of one or more thresholds of the same value for a next gradation is to be determined, (A) determining one or more candidate positions for the position of one or more thresholds of the same value for the next gradation, and (B) determining the position of a threshold for the next gradation among the candidate positions, the step (B) comprising the steps of (1) determining a particular frequency component of image data obtained based on a threshold array in which the positions of thresholds up to the given gradation have been determined, (2) determining the intensity of the particular frequency component in each of the candidate positions, (3) determining a candidate position in which the determined intensity of the particular frequency component is weak as the position of the threshold for the next gradation, and repeating the steps (1), (2), and (3) until all the positions of the thresholds of the same value for the next gradation are determined.

The letters (A), (B) and numerals (1), (2), (3) above are used for an easier understanding of the present invention.

According to the present invention, since a candidate position in which the determined intensity of the particular frequency component is weak is determined as the position of the threshold for the next gradation, the intensity of the particular frequency component in that position is increased, with the result that the threshold array used for generating a gradation image becomes a threshold array for suppressing unwanted particular frequency components.

The thresholds may be determined in increasing order from a smaller value (a minimum value if it is smallest), decreasing order from a larger value (a maximum value if it is largest), or in the order from both smaller and larger values to an intermediate threshold, or in the order from an intermediate threshold to both smaller and larger values.

According to the present invention, there is also provided a method of determining a threshold array for generating a gradation image, comprising the steps of, when the positions of thresholds up to a given gradation have been determined in a threshold array and the position of one or more thresholds of the same value for a next gradation is to be determined, (A) determining one or more candidate positions for the position of one or more thresholds of the same value for the next gradation, and (B) determining the position of a threshold for the next gradation among the candidate positions, the step (B) comprising the steps of (1) extracting a low-frequency component from image data obtained based on a threshold array in which the positions of thresholds up to the given gradation have been determined, (2) dividing the extracted low-frequency component into at least one frequency component, (3) determining the intensity of the frequency component in each of the candidate positions, (4) determining a candidate position in which the determined intensity of the particular frequency component is weak as the position of the threshold for the next gradation, repeating the steps (1), (2), (3), and (4) until all the positions of the thresholds of the same value for the next gradation are determined.

According to the present invention, a low-frequency component is extracted from image data obtained based on a threshold array in which the positions of thresholds up to the given gradation have been determined, the extracted low-frequency component is divided into at least one frequency component, the intensity of the frequency component in each of the candidate positions is determined, and a candidate position in which the determined intensity of the particular frequency component is weak is determined as the position of the threshold for the next gradation. Therefore, the intensity of the frequency component in that position is increased, with the result that the threshold array used for generating a gradation image becomes a threshold array for suppressing unwanted particular frequency components.

When the image data is converted into density image data which predicts an image to be reproduced on a recording medium by way of calculations, unwanted low-frequency components in a density image actually outputted from an image output apparatus can be suppressed more effectively.

The position of the threshold determined in the step (4) is used as a candidate position in which the intensities of at least two divided frequency components are weak. Low-frequency components can thus be suppressed more reliably.

The step (1) of extracting a low-frequency component from image data may comprise the steps of weighting the image data according to human visual characteristics, and extracting the low-frequency component from the image data. Thus, it is possible to extract a low-frequency component in a form closer to those visually recognized by human beings.

If the output resolution of an image output apparatus is defined as dpi (dots per inch) and the ruling thereof as lpi (lines per inch), then the ratio of dpi/lpi as an output condition is selected to be 10 or smaller. When the method is applied to the image output apparatus used to output a halftone image, a moiré pattern is prevented from occurring in a gradation image produced by the image output apparatus.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 9 is a diagram illustrative of a density simulation;

FIG. 18 is a diagram showing a threshold array determining sequence table;

DESCRIPTION OF THE PREFERRED EMBODIMENTS

Figure 1:
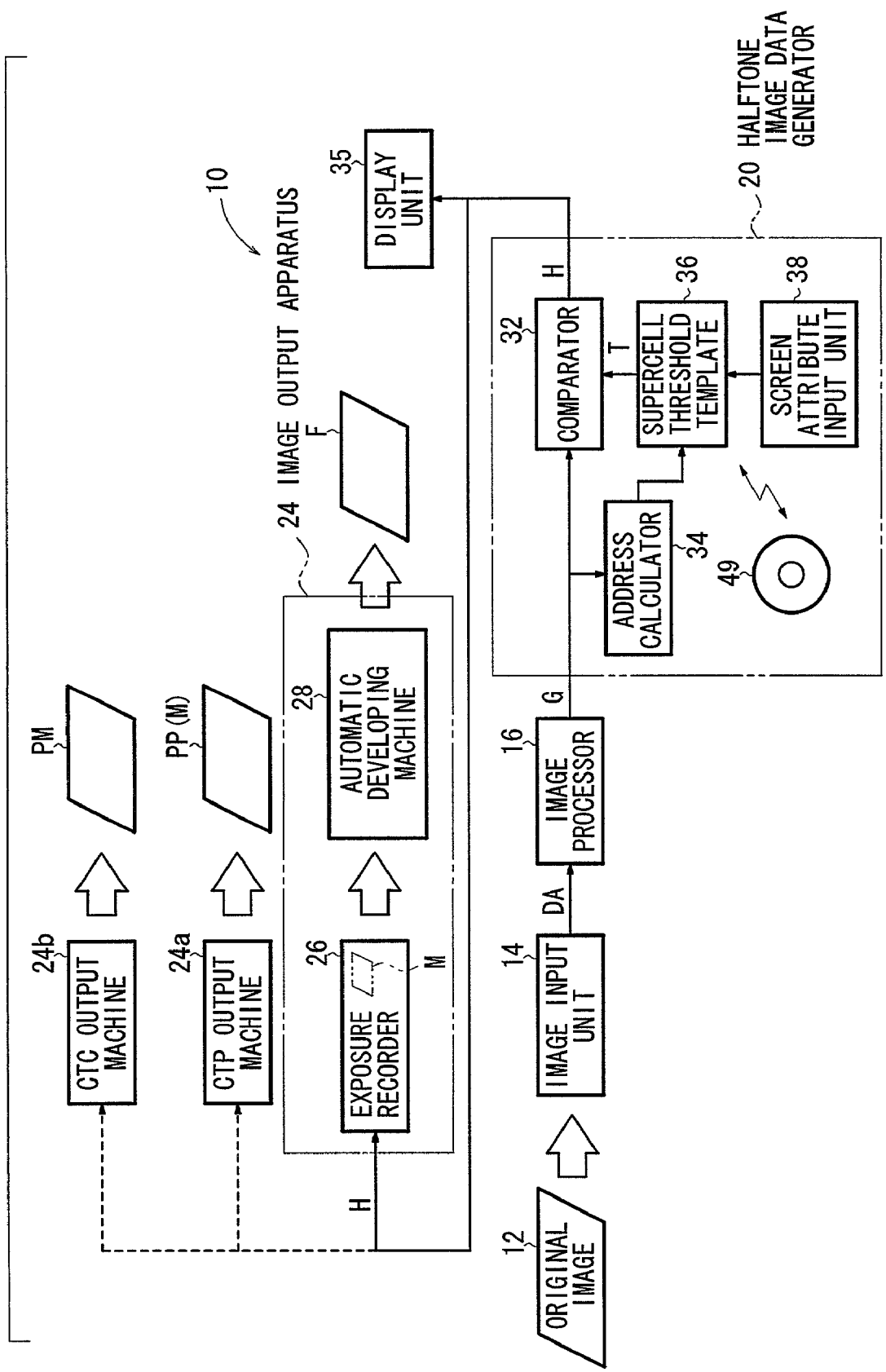
FIG. 1 is a block diagram of a platemaking system which incorporates a supercell threshold template according to an embodiment of the present invention.

FIG. 1 shows in block form a basic arrangement of a platemaking system 10 which incorporates a supercell threshold template (supercell threshold array) 36 according to an embodiment of the present invention.

As shown in FIG. 1, the platemaking system 10 basically comprises an image input unit 14, an image processor 16, a halftone image data generator 20 as a gradation image generator, and an image output apparatus 24. The platemaking system 10 is a system for forming, on a film F, an image which is read from an original image 12 by the image input unit 14 such as a scanner or the like, as halftone image that is a gradation image made up of a dot pattern.

In the image input unit 14, light reflected from or transmitted through the original image 12 which is irradiated by light from a light source and fed in an auxiliary scanning direction by a feed mechanism is applied to a photoelectric transducer such as a linear image sensor, which is electrically scanned in a main scanning direction. The photoelectric transducer converts the light reflected from or transmitted through the original image 12 into an electric image signal (pixel signal). The image signal is then converted by an A/D converter into 8-bit digital image data (simply referred to as "image data") DA which has values 0, 1, ... 255.

The image input unit 14 is not limited to a scanner or may be in the form of any medium capable of outputting digital image data, such as an image recording disk (image recording medium) such as a DVD or the like, a communication network, a digital still camera, or the like.

The image data DA outputted from the image input unit 14 is processed for color correction, sharpness, etc. by the image processor 16, which generates processed image data G.

In the present embodiment, the image output apparatus 24 has a resolution, i.e., an output resolution of 1200 scanning lines/inch, for example. Since the unit of the output resolution, i.e., scanning lines/inch, can easily be confused with the unit of the screen ruling, the output resolution will be represented by dpi (dots per inch) where a dot means one pixel.

The image output apparatus 24 may have resolution ranging from 900 dpi to 5000 dpi.

The processed image data G outputted from the image processor 16 is supplied to the halftone image data generator 20. The halftone image data generator 20 may also be supplied directly with digital image data generated and processed by a medium such as a digital camera or the like, as the image data G.

The halftone image data generator 20 may be software-implemented on a computer, or may comprise a piece of hardware, or may be in the form of a combination of software and hardware.

The halftone image data generator 20 comprises a comparator 32 functioning as a gradation image data generating means (halftone image data generating means), an address calculator 34, a supercell threshold template (threshold array) 36 as a storage medium for storing a plurality of threshold arrays for generating gradation image data, and a screen attribute input unit 38 as a selecting means for selecting a desired one of the threshold arrays.

The image data G supplied to the halftone image data generator 20 is applied to a comparison input terminal of the comparator 32. The address calculator 34 calculates, from the image data G, an address AD=AD (x, y) representing x- and y-axes addresses on the supercell threshold template 36.

The supercell threshold template 36 reads a threshold (threshold data of 8 bits representing a value ranging from 1 to 255 (more accurately a value obtained by subtracting 1 from 8 bits, but hereinafter referred to as 8 bits for convenience)) T stored in the specified address AD, and supplies the threshold T to a reference input terminal of the comparator 32.

As the supercell threshold template 36, there is used a supercell threshold template among a plurality of supercell threshold templates which corresponds to screen attributes (a screen ruling, a screen angle, and a screen shape) specified by the screen attribute input unit 38. In the present embodiment, it is assumed that the screen ruling is 175 lpi, the screen angle is 15°, and the screen shape is a square shape.

The screen ruling may be of any value selected from a range from 50 to 600 lpi, such as 85 lpi, 175 lpi, 300 lpi, etc.

A supercell comprises a plurality of dot cells (also referred to as "dots"). In the art of generating halftone dots, it is customary to set up a supercell on a pixel grid determined depending on the output resolution, divide the supercell into dot cells, and assign thresholds respectively to pixels in the divided dot cells for thereby generating halftone thresholds. The supercell with the thresholds assigned to the dot cells is referred to a supercell threshold template (threshold array).

For details of the generation of halftone dots in relation to a supercell, reference should be made to, for example, a book entitled "Postscript screening" written by Peter Fink, published by MDN corporation on Aug. 11, 1994, 1st edition, 1st printing.

A supercell which comprises a plurality of dot cells makes it possible to change the screen ruling and the screen angle at smaller intervals, allowing the selection of values closer to a screen ruling and a screen angle which have been specified.

A pixel grid refers to a cluster of pixels as blackening units, and may be perceived as a matrix of pixels arranged in rows and columns at a specified output resolution.

The comparator 32 compares the image data G with the threshold data (also referred to as "threshold") T, and generates halftone image data (also referred to as "binary data", "binary image data", "binary halftone image data", or "digital halftone data") H as gradation image data representing a dot pattern having a value of 1 or 0 (G≧T→1 (on or blackened), G<T→0 (off, blank, whitened, unblackened, or non-blackened). An image displayed on a display unit 35 such as a display panel or the like as a display medium based on the generated halftone image data H is a gradation image comprising a clustered pattern (hereinafter referred to as "dot pattern") of dot cells having dots comprising 0 or 1 or more blackened pixels.

The generated halftone image data H, i.e., the gradation image data, is supplied to an exposure recorder 26 of the image output apparatus 24.

In the exposure recorder 26, a photosensitive medium M is exposed to and scanned by a laser beam (recording beam) that is selectively turned on and off depending on the halftone image data H, forming a halftone image as a latent image on the photosensitive medium M. The halftone image formed as a latent image on the photosensitive medium M is then developed into a visible halftone image by an automatic developing machine 28, which produces a film F with the visible halftone image formed thereon. The film F is used as an original plate, and a printing plate is produced from the film F. The produced printing plate is mounted on a printing press, not shown, and an ink is applied to the mounted printing plate.

The ink applied to the printing plate is then transferred to a sheet as a recording medium such as a printing sheet or the like, thus producing a desired printed material with the image recorded on the sheet.

The principles of the present invention are applicable to not only the image output apparatus 24 for outputting a film F as an original plate, but also a CTP (Computer To Plate) output machine 24a which is capable of directly outputting a printing plate PP based on the halftone image data H. In the CTP output machine 24a, a photosensitive medium M is scanned by a laser beam (recording beam) to produce a printing plate PP directly.

The image output apparatus is not limited to a scanning exposure apparatus using a laser beam, but may be an apparatus for producing a film, a printing plate, or a printed material according to a surface exposure process or an ink jet process.

The principles of the present invention are also applicable to a CTC (Computer To Computer) output machine 24b. In the CTC output machine 24b, a photosensitive medium M wound around a cylinder is scanned by a laser beam to produce a printing plate, and an ink is applied to the printing plate and then transferred to a sheet as a recording medium, thus producing a desired printed material PM with the image recorded on the sheet.

The threshold array of the supercell threshold template 36 of the halftone image data generator 20 shown in FIG. 1 may be recorded on a portable storage medium 49 which may be a package medium such as a CDROM, a CDR, etc.

The halftone image data generator 20 may comprise a piece of hardware or may be a piece of software run by a computer. In such an application, the supercell threshold template 36 (threshold array) is stored in a storage medium such as a hard disk.

The basic arrangement of the platemaking system 10 which incorporates a threshold array according to the present invention has been described above.

An threshold array generating apparatus for carrying out a method of determining a threshold array for generating a gradation image according to the present invention will be described below.

Figure 2:
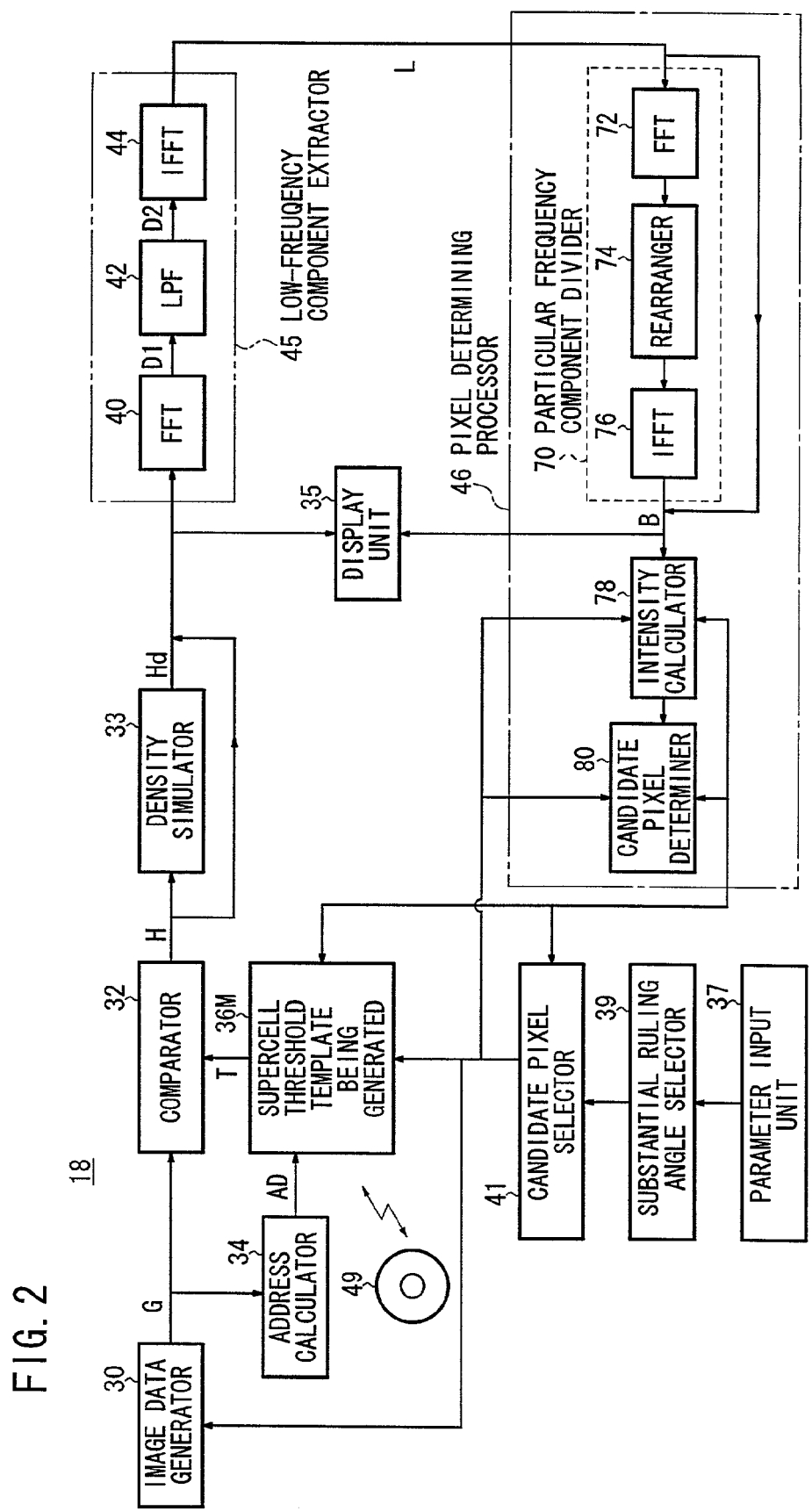
FIG. 2 is a block diagram of a threshold array generating apparatus.

FIG. 2 shows a threshold array generating apparatus 18 for generating supercell threshold templates (threshold arrays) 36 each composed of a plurality of thresholds T (1, 2, . . . 255) for generating a gradation image, the threshold array generating apparatus 18 comprising a storage medium such as a RAM (Random Access Memory), a hard disk, or the like which serves as a memory means. The gradation image referred to above is a multi-valued image such as a binary image (a gradation image composed of blackened pixels and whitened (blank) pixels) or a four-valued image (e.g., a gradation image made up of pixels having gradations represented by four densities 0, 1, 2, 3).

Those part of the threshold array generating apparatus 18 which are identical to those of the platemaking system 10 shown in FIG. 1 are denoted by identical reference characters, and will not be described in detail below.

The threshold array generating apparatus 18 has a parameter input unit 37 for setting input parameters including a screen ruling, a screen angle, an output resolution, a screen shape, etc., a substantial ruling angle selector 39 for selecting a substantial ruling and angle depending on the set input parameters, and a candidate pixel selector 41 for selecting blackening candidates depending on the selected substantial ruling and angle. When thresholds of the supercell threshold templates 36 are determined, the candidate pixel selector 41 functions as a blackening candidate pixel selector for selecting blackening candidate pixels if a threshold of a higher next gradation is determined, and as a whitening candidate pixel selector for selecting whitening candidate pixels if a threshold of a lower next gradation is determined.

The threshold array generating apparatus 18 also has an image data generator 30, an address calculator 34, a supercell threshold template 36M which is being generated, a comparator 32, and a density simulator 33.

The image data generator 30 generates image data G having a constant threshold value over a size of a supercell threshold template to generate an image pattern according to a determined threshold array depending on candidate pixels selected by the candidate pixel selector 41.

The address calculator 34 calculates an address AD based on the image data G generated by the image data generator 30, and supplies the generated address AD to the supercell threshold template 36M which is being generated.

The supercell threshold template 36M which is being generated stores (saves) thresholds successively determined from an initial state where all thresholds T are zero and hence essentially are not provided.

The comparator 32 generates halftone image data H having a value 0 or a value 1 from the thresholds T being generated (thresholds T already determined) and the image data G.

The density simulator 33 generates density image data Hd (binary data of "0" and "1") corresponding to a density image outputted from the image output apparatus 24 based on the halftone image data H.

In FIG. 2, the display unit 35 can display the halftone image data H or the density image data Hd.

The threshold array generating apparatus 18 further includes a low-frequency component extractor 45 for extracting low-frequency component data (a low-frequency noise component, low-frequency noise data, or a low-frequency component) L from the halftone image data H outputted from the comparator 32 or the density image data Hd outputted from the density simulator 33, and a pixel determining processor 46 for calculating a low-frequency component intensity at the position of a candidate pixel selected by the candidate pixel selector 41 and determining a next pixel position as a position where a threshold is to be provided based on the calculated low-frequency component intensity.

The low-frequency component extractor 45 comprises a fast Fourier transformer (FFT) 40 as a frequency converting means, a low-pass filter (LPF) 42, and an inverse FFT (IFFT) 44 as an inverse frequency converting means. The frequency converting means is not limited to the Fourier transformer 40, but may comprise a weblet converting means. If the frequency converting means comprises a weblet converting means, then the inverse frequency converting means comprises inverse weblet converting means.

The low-frequency component extractor 45 may be arranged to extract a low-frequency component by way of filtering (convoluting operation) in an actual space without the need for a frequency converting means. Depending on the mask size of the convoluting operation or the image data size, the time required to extract a low-frequency component may often be shorter using a frequency converting means than using the convoluting operation.

The halftone image data H generated by the comparator 32 is supplied to the FFT 40 either through the density simulator 33 or directly. Whether the halftone image data H is to be supplied to the FFT 40 either through the density simulator 33 or directly may be determined by a selecting means, not shown.

The halftone image data H is image data in the position space (actual space). The data in the position space refers to data in a coordinate system on the xy plane. The halftone image data H in the position space is converted by the FFT 40 into data D1 as an information signal in a frequency space, which is supplied to the LPF 42. The cut-off frequency of the LPF 42 is set to a basic frequency component of halftone dots (screen ruling component). The data in the frequency space refers to data in a coordinate system defined in a frequency space having x- and y-axes as frequency axes.

The LPF 42 extracts data D2 containing low-frequency components lower in frequency than the basic frequency component of halftone dots (screen ruling component) from the data D1 in the frequency space, and supplies the extracted data D2 to the IFFT 44.

The IFFT 44 converts the data D2 containing low-frequency components extracted in the frequency space into low-frequency component data L which is image data in the position space, and supplies the low-frequency component data L to the pixel determining processor 46.

The pixel determining processor 46 comprises a particular frequency component divider 70 for analyzing the low-frequency component data L for frequencies and dividing and extracting a plurality of particular frequency component data B, an intensity calculator 78 for calculating the intensities of the extracted particular frequency component data B at respective candidate pixel positions, and a candidate pixel determiner 80 for determining blackening pixels and whitening pixels among blackening candidate pixels and whitening candidate pixels based on the calculated intensities. The particular frequency component divider 70 comprises an FFT 72 which is functionally identical to the FFT 40, a rearranger 74, and an IFFT 74 which is functionally identical to the IFFT 44.

The pixel determining processor 46 can determine candidate pixels from either the particular frequency component data B outputted from the particular frequency component divider 70 or the low-frequency component data L. Whether the particular frequency component data B or the low-frequency component data L is to be used may be determined by a selecting means, not shown.

A threshold array determined by the pixel determining processor 46 based on the low-frequency component data L or the particular frequency component data B is supplied to the supercell threshold template 36M which is being generated. When all threshold arrays ranging from 1 to 255 are determined and stored, the supercell threshold template 36M which is being generated is regarded as a supercell threshold template 36 whose thresholds have all been determined and then is stored in the storage medium 49. The stored supercell threshold template 36 is copied from the storage medium 49 to the supercell threshold template 36 in the platemaking system 10 shown in FIG. 1 for use therein.

Operation of the threshold array generating apparatus 18 shown in FIG. 2 will be described below with reference to FIG. 3.

In step S1, the parameter input unit 37 sets input parameters. For example, the input parameters include a screen ruling of 175 lpi=6.89 lines/mm, a screen angle of 15 degrees, an output resolution of 1200 dpi=47 dots/mm (pixels/mm) (one pixel has a square size having sides each about 21 μm long), and a square screen shape. The screen shape may be a circular or any other geometrical shape other than the square shape.

The substantial ruling angle selector 39 selects the number of pixels of a supercell (supercell threshold template 46) as a threshold array in step S2, selects an arrangement of a halftone image (size, number, and angle) in step S3, and selects a pixel number Ndot per gradation in step S4.

Figure 4:
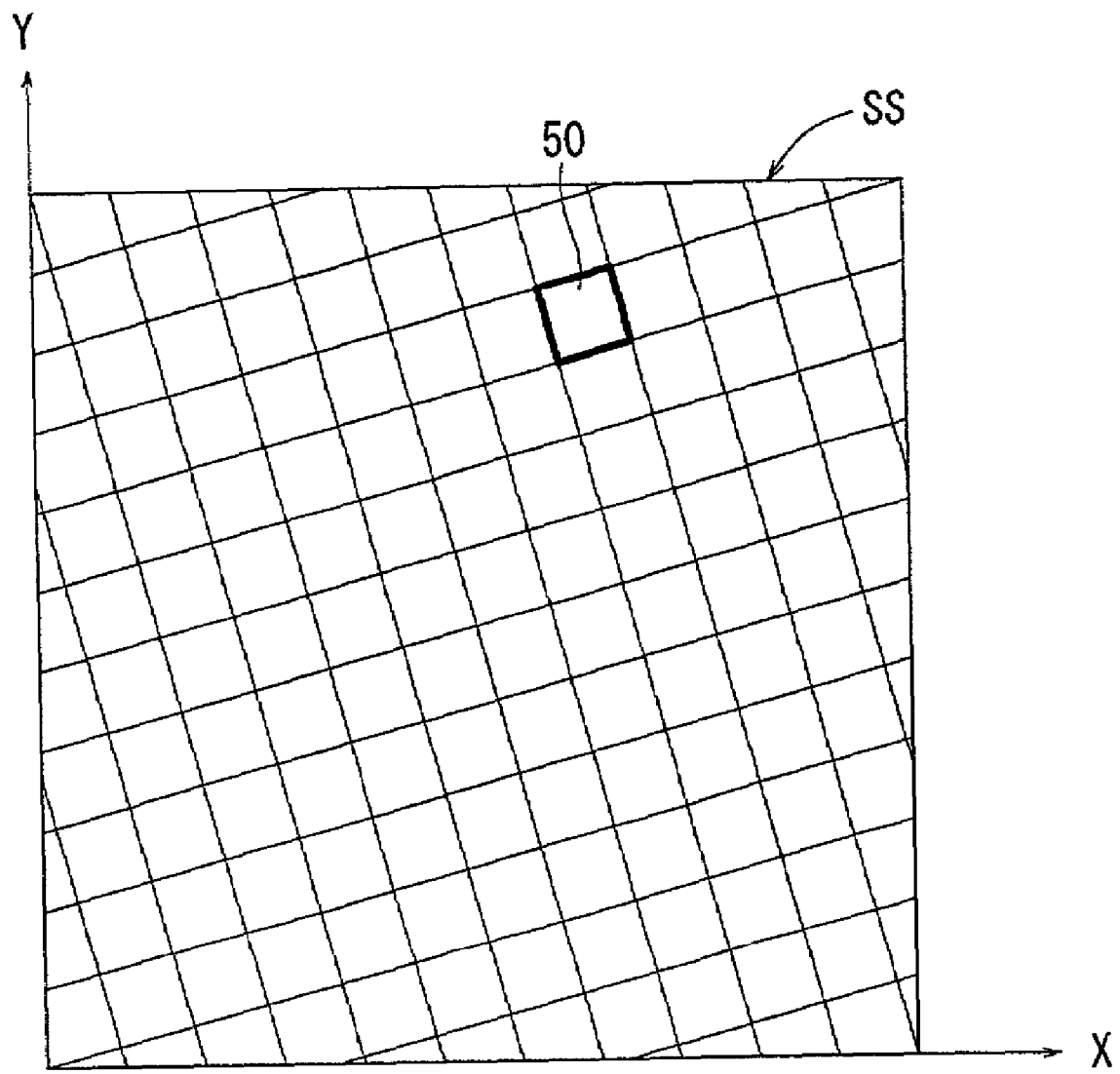
FIG. 4 is a diagram illustrative of the setting of input parameters.

FIG. 4 shows a single supercell SS composed of a plurality of halftone dots (dot cells) 50 formed according to the set input parameters.

The pixel number Ndot per gradation in the supercell SS is determined by the following equation (1):

$$\text{Ndot}=(\text{pixel number of supercell})/(\text{gradation number}) \quad (1)$$

This means that when the number of required gradations is 256, there are Ndot thresholds T to be provided in the supercell threshold template 36M which is being generated, or stated otherwise, there are Ndot thresholds T=1, T=2, ... T=255 provided in the supercell threshold template 36.

In the present embodiment, a process of determining thresholds 1 through 255 with respect to an instance where 256 gradations are required will be described.

Alternatively, if the total number of pixels in the supercell SS is indicated by Nall, then thresholds 1 through Nall may be calculated and divided by the number Ndot of pixels per gradation to produce thresholds 1 through 255. With the thresholds 1 through Nall being calculated, even if the number of required gradations is changed, thresholds can easily be produced by changing the number Ndot of pixels per gradation which serves as a divisor.

In the present embodiment, it is assumed for an easier understanding that thresholds T of the supercell threshold template 36M which is being generated have been determined to a certain gradation, and operation of the threshold array generating apparatus 18 for determining the position of a threshold T (T←T+1) of a next gradation of Ndot pixels (one or more pixels), i.e., the position of one or more thresholds having the same value, will be described below.

In step S5, the candidate pixel selector 41 selects a plurality of positions of a plurality of pixels having the same value of a next gradation in order not to impair the shape of the screen. The candidate positions correspond to the positions of candidate pixels to be blackened next, and hence are referred to as blackening candidate pixels.

If the number of blackening candidate pixels is m, then it is selected as m=Ndot+α, e.g., Ndot×2. If the margin α is increased, then the degree of freedom of the threshold array is increased, but the blackening shape of the screen, or the square shape in this example, is lost. The blackening candidate pixels should preferably be selected to satisfy the halftone dot characteristics (ruling, angle, and shape) set in step S1, and it is necessary to calculate pixels around the pixels which are currently being blackened in order to keep the periodicity of the dots.

Figure 5:
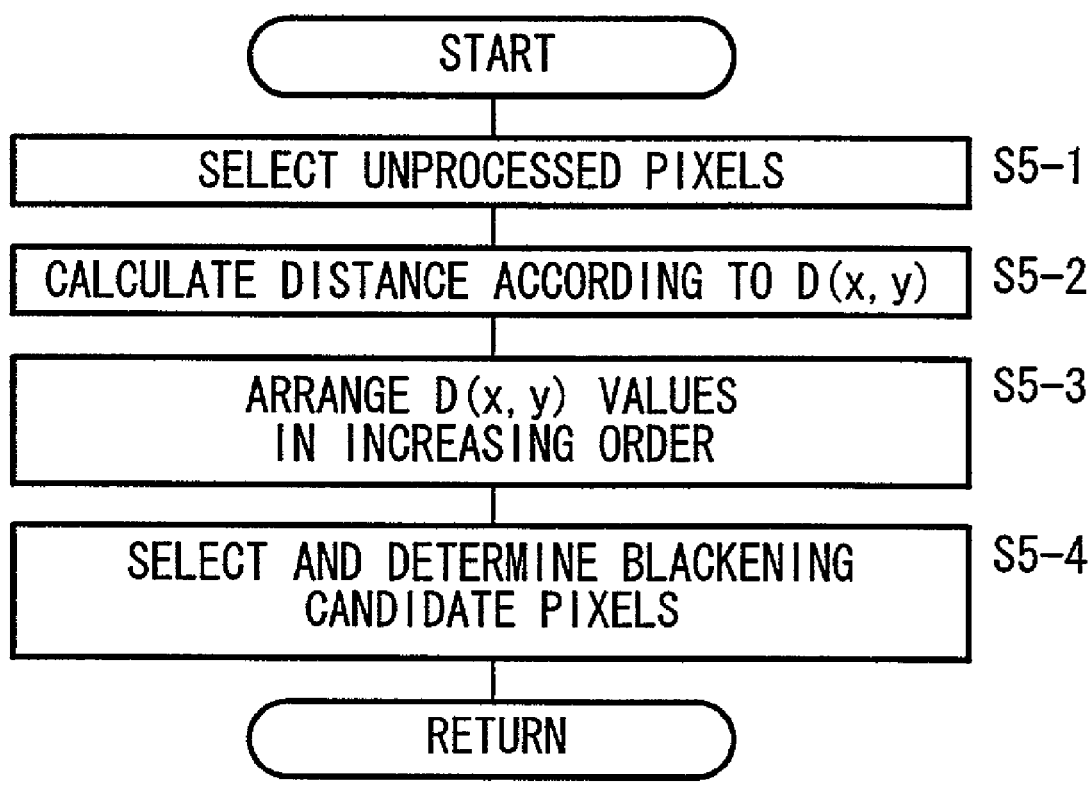
FIG. 5 is a flowchart of a detailed process of selecting blackening candidate pixels in the process of determining a threshold array shown in FIG. 3.
Figure 6:
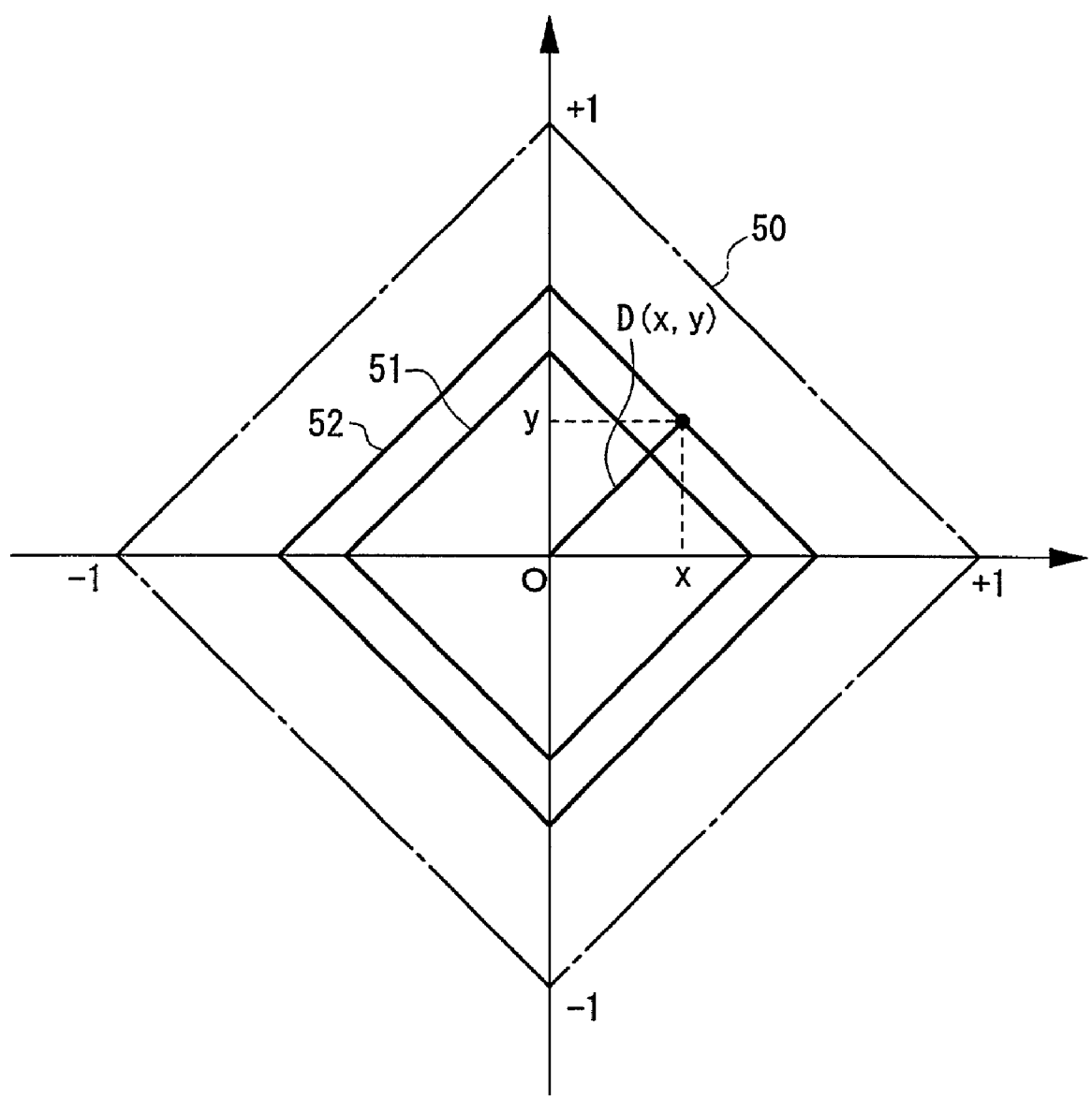
FIG. 6 is a diagram illustrative of a distance function.

FIG. 5 shows a process of selecting blackening candidate pixels. In step S5-1, unprocessed pixels which have not yet been blackened are selected. In step S5-2, a distance is determined with respect to each of the unprocessed pixels selected in step S5-1, as follows:

As schematically shown in FIG. 6, the distance from the center O of each dot 50 whose size has been standardized to ±1 to an unprocessed pixel, i.e., to a pixel position where a threshold is not provided, is determined according to the following distance function D (x, y) which meets a desired shape of square:

$$D(x, y) = 1 - (|x| + |y|) \quad (2)$$

In FIG. 6, if a threshold array within a square 51 including the center O has been determined, then the distance up to an unprocessed pixel near a side of a square 52 is determined according to the distance function D (x, y).

If a blackened region is of a circular thick dot shape, then the distance function D (x, y) may be expressed by the following equation (3):

$$D(x, y) = 1 - (x^2 + y^2) \quad (3)$$

The distance function D (x, y) corresponds to a so-called spot function, and may be any of various functions depending on the desired screen shape.

In step S5-3, the values of the distance functions D (x, y) of the respective unprocessed pixels are rearranged in increasing order.

In step S5-4, the values of the distance functions (x, y) determined in step S5-3 are selected in increasing order until the number of blackening candidate pixels as unprocessed pixels is equalized to m (m=Ndot+α).

When m blackening candidate pixels are selected, the candidate pixel selector 41 transfers the pixel positions of the selected m blackening candidate pixels to the pixel determining processor 46.

A process of determining the positions of a plurality of blackening candidate pixels, i.e., thresholds of a plurality of candidates, will be described below.

In step S6, halftone image data H as gradation image data is generated by the comparator 32 based on the supercell threshold template 36M which is being generated where an already determined threshold array is stored. The image data G based on which the halftone image data H is generated is set to T (G=T). Specifically, for generating halftone image data H representing a threshold array of already determined thresholds T of 1 through T if the position of a threshold T+1 is to be determined, the image data generator 30 supplies the value G=T as the value of the image data G by a supercell threshold size to the comparator 32.

Figure 7:
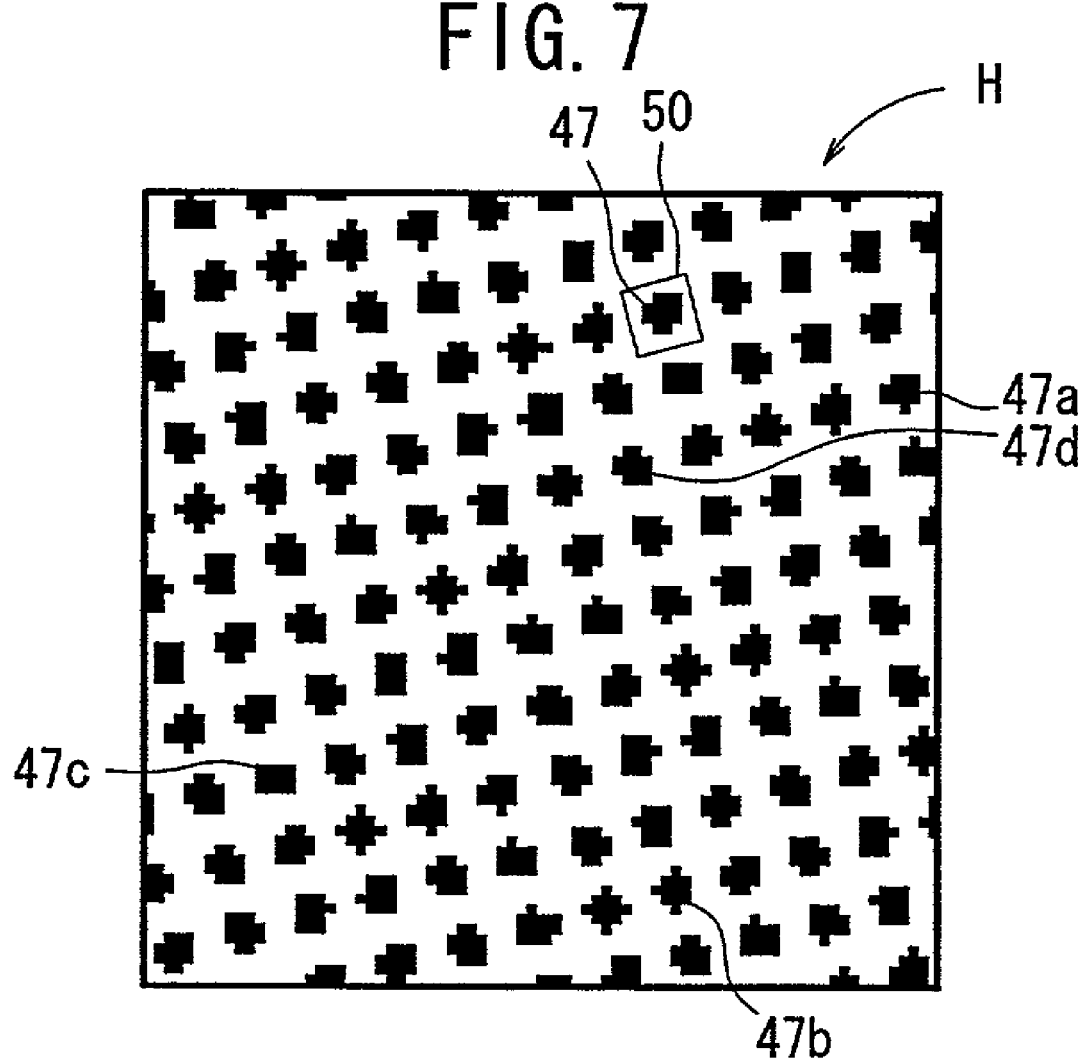
FIG. 7 is a diagram showing an image in a position space which is represented by halftone image data.

FIG. 7 schematically shows a halftone image represented by the halftone image data H. The halftone image data H is generated by the comparator 32 using the supercell threshold template 36M which is being generated when the image data G is G=T.

In FIG. 7, the halftone image comprises a screen tint (a dot pattern of uniform density which is composed of dots having a substantially constant dot %), and is a halftone image (referred to as a bit pattern or a dot pattern) based on the halftone image data H according to one supercell SS which is generated by the comparator 32. The basic frequency of the halftone dots is equal to the actual screen ruling.

In FIG. 7, the halftone image data (halftone image) H of a certain gradation is formed of a clustered pattern of dot cells 50 having dots 47 made up of one or more blackening pixels. The halftone image data H represents one supercell and is made up of a plurality of dot cells (dots) 50. The dot 47 in the dot cell indicated by the reference numeral 50 is made up of 13 blackening pixels. The dot 47a in another dot cell which is not indicated by the reference numeral 50 is made up of 12 blackening pixels. The dot 47b is made up of 12 blackening pixels. The dot 47c is made up of 12 blackening pixels. The dot 47d is made up of 13 blackening pixels. The numbers of these dots can easily be confirmed on an image displayed on the display unit 35. The number or the positions of blacking pixels in each dot cell are different from the number or positions of blacking pixels in another dot cell.

Figure 8:
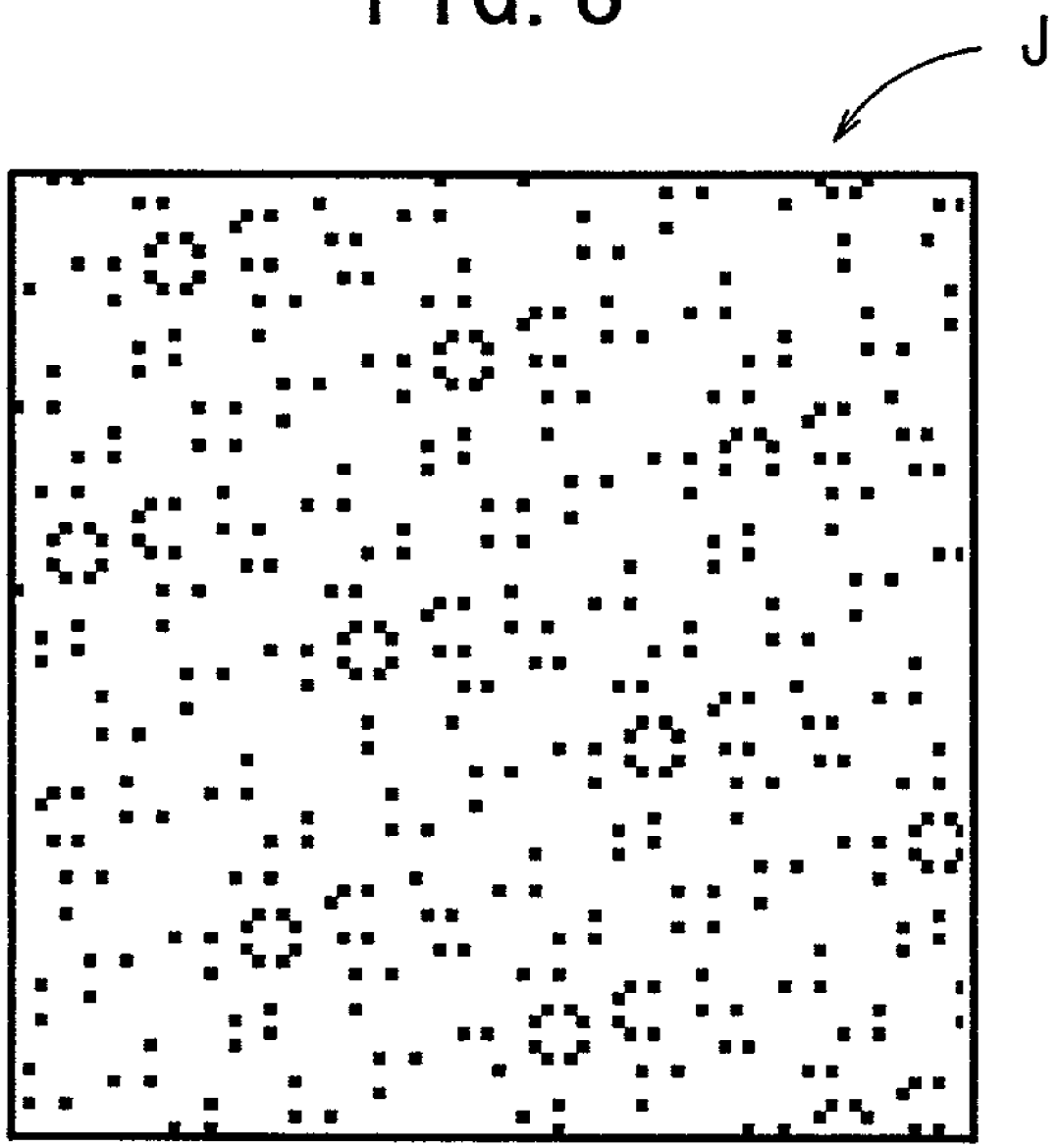
FIG. 8 is a diagram showing next blackening candidate pixels for the image shown in FIG. 7.

FIG. 8 shows an arrangement of blackening candidate pixels in a supercell based on blackening candidate pixel data J calculated from the halftone image data shown in FIG. 7 according to the process of selecting candidate pixels in step S5. Blackening candidate pixels are selected to satisfy the halftone dot characteristics (ruling, angle, and shape) set in step S1, and selected from the pixels around the pixels which have already been blackened with the halftone image data H shown in FIG. 7.

In step S7, the density image data Hd corresponding to a density image obtained from the halftone image data H is simulated by the density simulator 33. The density image is a gray-scale image outputted from the image output apparatus 24 supplied with the halftone image data H and formed on the film F, for example. The data representing the gray-scale image is referred to as the density image data Hd.

In FIG. 9, the left-hand side represents the halftone image data H with each pixel being of a square shape. When an image is actually outputted from the image output apparatus 24, it is rare for each pixel to be of a square shape, and each pixel can generally be approximated roughly as being of a circular shape or an elliptical shape. Such a dot thickening may be referred to as dot gain. The density image data Hd is data representing a density predicted based on the areas shown hatched on the right-hand side of FIG. 9.

The radius of a circular shape in the density image data Hd shown in FIG. 9 can be determined by actually outputting a test pattern from the image output apparatus 24 and measuring how each pixel of the original halftone image data H is outputted on the gray-scale image of the test pattern. The area ratio of the density image data Hd which is close to the actual density image can be calculated from the halftone image data H using the radius thus determined.

FIG. 9 shows how dots are thickened when the halftone image data H composed of one pixel, three pixels, and four pixels are converted into the simulated density image data Hd composed of one pixel, three pixels, and four pixels. In the example shown in FIG. 9, each pixel is approximated by a circular shape, and its density is predicted.

The density image data Hd can be determined accurately by the method disclosed in Japanese Laid-Open Patent Publication No. 11-112814. Specifically, the amount of exposure can be integrated from the beam shape used in the image output apparatus 24, and a density image can be predicted from the gamma characteristics of the photosensitive medium used.

A process of predicting a density image by way of calculations will be described in detail below. First, a simulated shape for computer calculations of a laser beam BP for forming a pixel on a recording medium such as the film F is determined. For example, a simulated shape is shown as a substantially conical laser beam BP in FIG. 10B. The laser beam BP has a shape close to the Gaussian distribution, and can substantially be expressed by a beam diameter defined by the maximum value $1/e^2$ of the amplitude.

Then, the laser beam BP and the halftone image data H (see FIG. 10A which is identical to FIG. 7) produced by the comparator 32 are subjected to convoluting calculations (the halftone image data H*BP: the notation "*" represents convoluting calculations) to calculate the amount of exposure for each pixel.

Then, the calculated amount of exposure for each pixel is converted into the density of each pixel by exposure characteristics 90 (see FIG. 10C) of the photosensitive medium such as the film F, i.e., the gamma characteristics thereof. From the density of each pixel thus determined, there can be obtained density image data Hd shown in FIG. 10D as representing a density simulated image from the density simulator 33.

While a film setter using a photosensitive medium in a photon mode where the amount of exposure is integrated has been described above, the density image can also be calculated on a CTP apparatus which uses a photosensitive medium in a thermal mode.

Figure 10A:
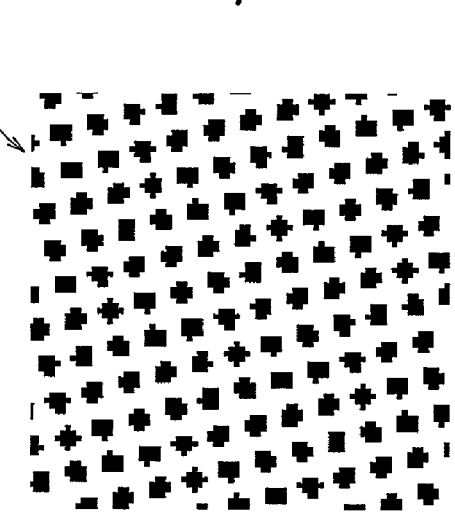
FIG. 10A is a diagram showing an image based on halftone image data.
Figure 10B:
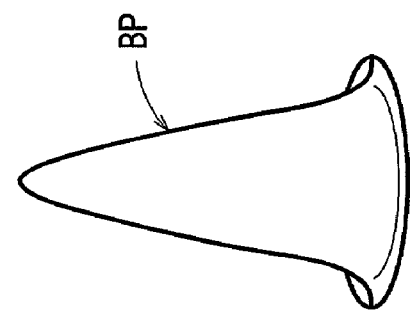
FIG. 10B is a diagram showing a shape of a laser beam.
Figure 10C:
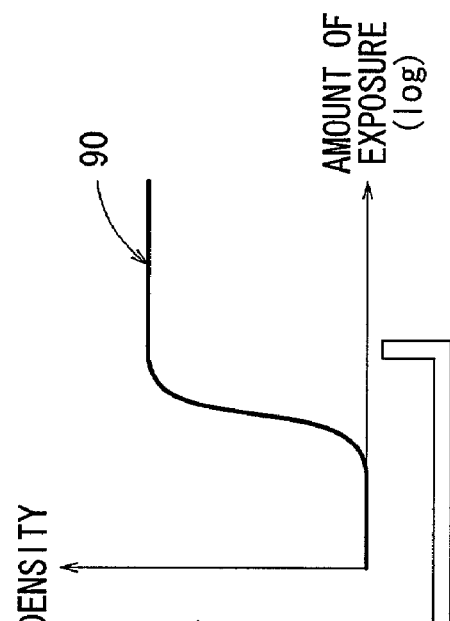
FIG. 10C is a diagram showing gamma characteristics.
Figure 10D:
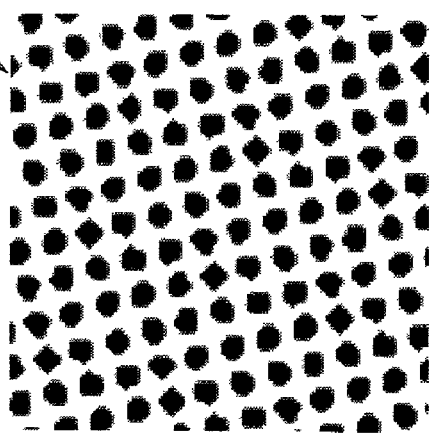
FIG. 10D is a diagram showing a density image.
Figure 10E:
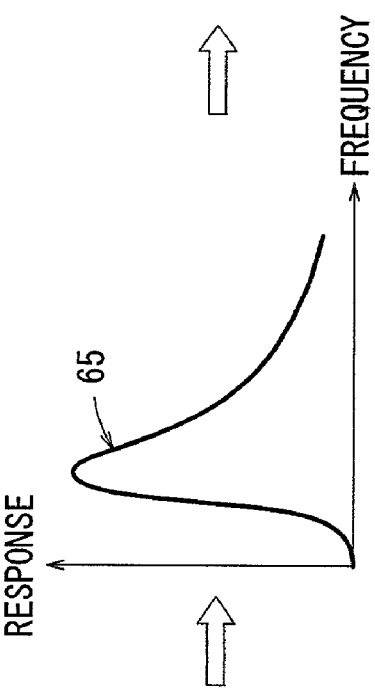
FIG. 10E is a diagram showing human visual characteristics.

The density image data Hd shown in FIG. 10D represents the density predicted when the halftone image data H made up of square pixels shown in FIG. 10A is outputted from the image output apparatus 24.

In step S8, the low-frequency component extractor 45 extracts low-frequency component data L from the density image data Hd. While the low-frequency component data L can be extracted from the halftone image data H, the low-frequency component data L extracted from the density image data Hd whose density has been simulated by the image output apparatus 24 is more effective to remove moiré. In the present embodiment, therefore, it is assumed that the low-frequency component data L is extracted from the density image data Hd.

In step S8, the density image data Hd is transformed by the two-dimensional FFT 40, and converted into data D1 as an information signal in the frequency space.

Then, the data D1 is processed by the LPF 42 whose cut-off frequency is set to a basic frequency component of halftone dots, thus extracting data D2 containing low-frequency components.

Figure 11:
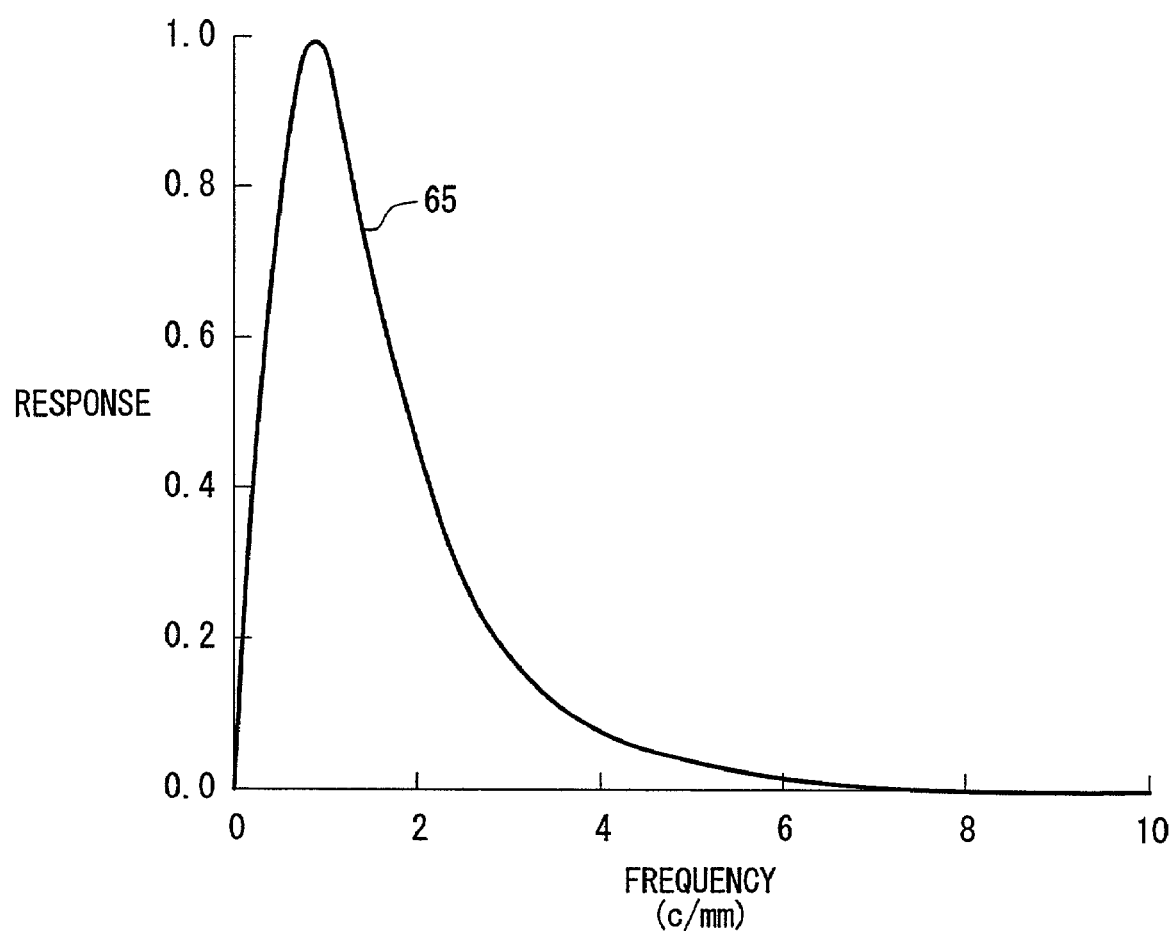
FIG. 11 is a diagram showing human visual characteristics.

Actually, moiré patterns are visually perceived by the human being. Therefore, when high-frequency components are removed by the LPF 42 from the data D1 which is produced by converting the density image data Hd with the FFT 40, the data 1 is weighted according to human visual characteristics 65 shown in FIG. 11, and thereafter processed by the LPF 42 to extract low-frequency components. As shown in FIG. 11, the human visual characteristics 65 have a maximum sensitivity in the vicinity of the frequency of 0.8 (c/mm).

Figure 10F:
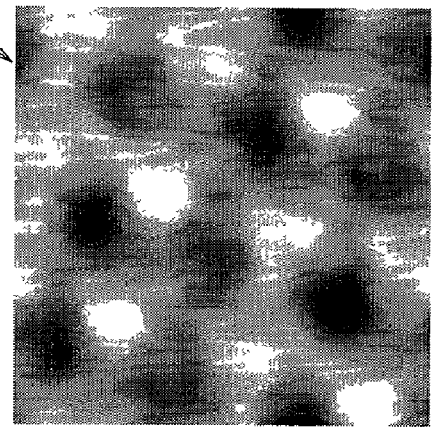
FIG. 10F is a diagram showing an image based on low-frequency components.

Then, the FFT 44 inversely Fourier-transforms the low-frequency component data D2 extracted by the LPF 42, producing low-frequency component data L in the position space (actual space) shown in FIG. 10F. It can be seen that a moiré pattern is generated from the low-frequency component data L. In FIG. 10F, darker regions are regions where the signal intensity is stronger than lighter regions.

The low-frequency component data L is supplied from the low-frequency component extractor 45 to the pixel determining processor 46.

In step S9, the FFT 72 of the particular frequency component divider 70 in the pixel determining processor 46 divides the low-frequency component data L into a particular frequency component (basic frequency component). The particular frequency component is supposed to be inherently included in the density image data Hd generated based on the supercell threshold template 36.

Figure 12:
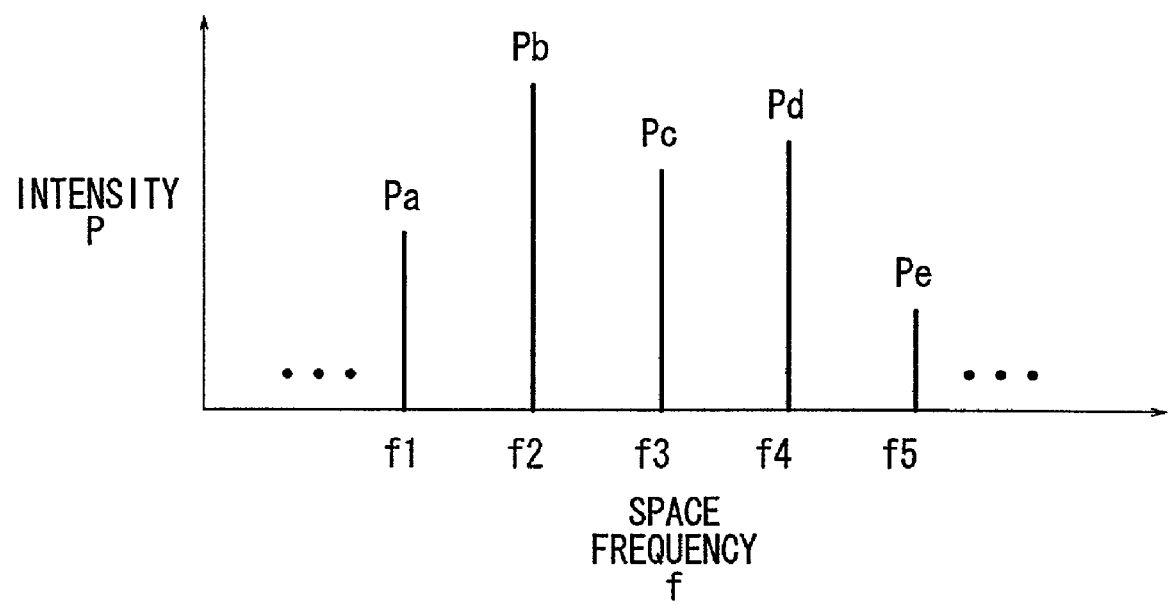
FIG. 12 is a diagram showing intensities of low-frequency components as they are subjected to a Fourier transform.

FIG. 12 shows in a one-dimensional space particular frequency components f1 (intensity Pa), f2 (intensity Pb), f3 (intensity Pc), f4 (intensity Pd), f5 (intensity Pc), . . . of the space frequencies divided from the low-frequency component data L (actually, the particular frequency components occur in a two-dimensional space).

In step S10, the rearranger 74 compares the intensities of the particular frequency components and rearranges them in reducing order. In FIG. 12, the particular frequency components are rearranged in the order of f2 (Pb), f4 (Pd), f3 (Pc), f1 (Pa), f5 (Pe).

In step S11, the particular frequency components (basic frequency components) are converted into frequency components in the actual space by the IFFT 76 in intensity-reducing order.

In step S12, the intensity calculator 78 calculates the intensities of the particular frequency components (basic frequency components) at the respective blackening candidate pixel positions.

In step S13, the pixel determiner 80 excludes blackening candidate pixels in positions which strengthen the extracted frequency components from the candidates. Stated otherwise, the pixel determiner 80 leaves blackening candidate pixels whose extracted frequency components are weak in intensity.

In step S14, it is confirmed whether the number of remaining blackening candidate pixels is equal to the number Ndot of pixels per gradation or not. The process ranging from step S11 to step S14 is repeated to narrow down candidates until the number of remaining blackening candidate pixels becomes the number Ndot of pixels per gradation.

A procedure in steps S9 through S14 will be described in specific detail below.

Figure 13A:
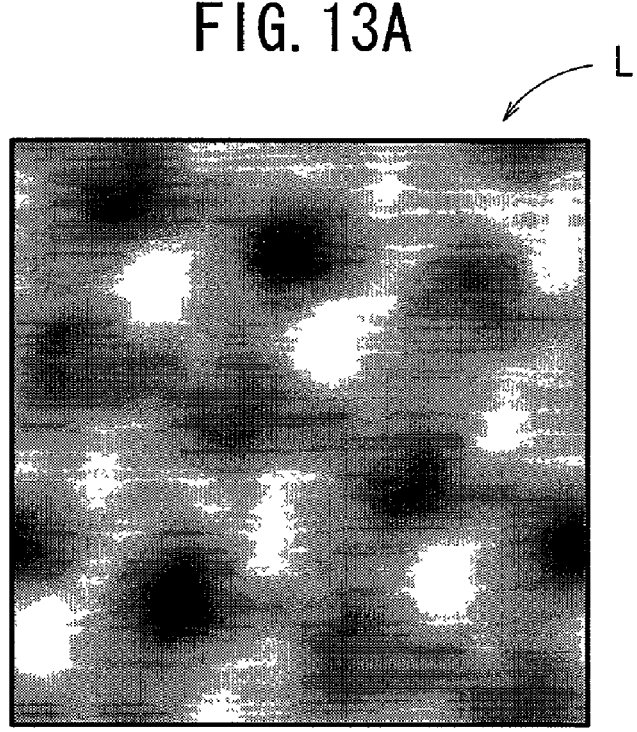
FIG. 13A is a diagram showing an image based on low-frequency components.
Figure 13B:
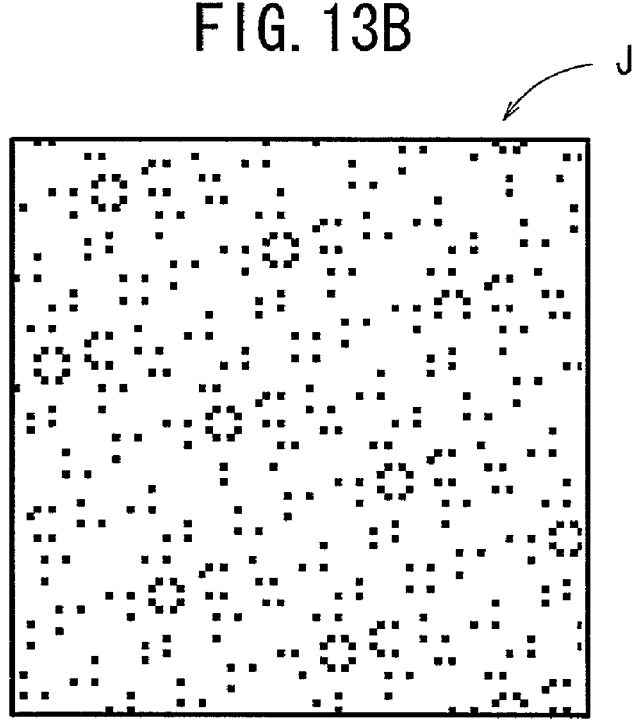
FIG. 13B is a diagram showing first blackening candidate pixels.

For the low-frequency component data L shown in FIG. 13A (identical to FIG. 10F), the blackening candidate pixel data J has been determined as shown in FIG. 13B (identical to FIG. 10F).

Figure 14A:
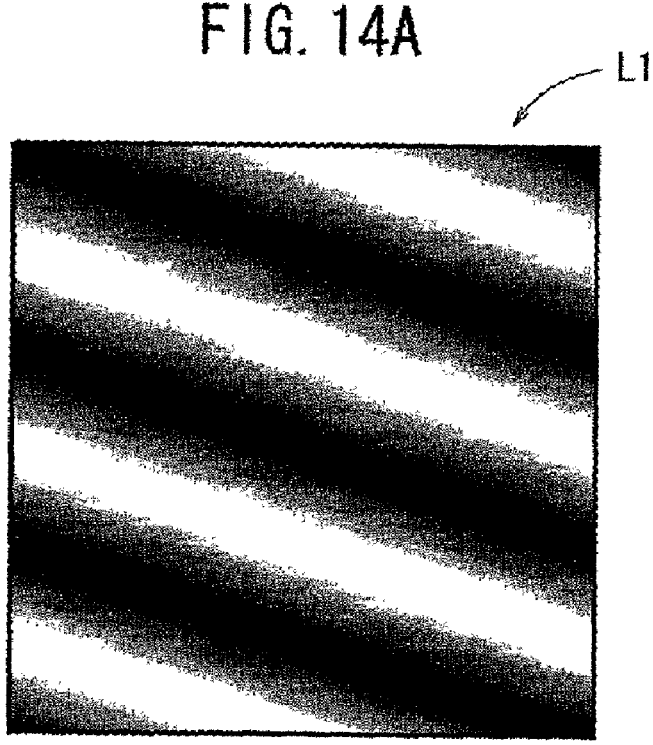
FIG. 14A is a diagram showing an image based on the strongest of the low-frequency components.

FIG. 14A shows frequency component data L1 in the actual space which has been divided as the particular frequency component f2 (intensity Pb) in step S11 and whose frequency component intensity is the largest.

Figure 14B:
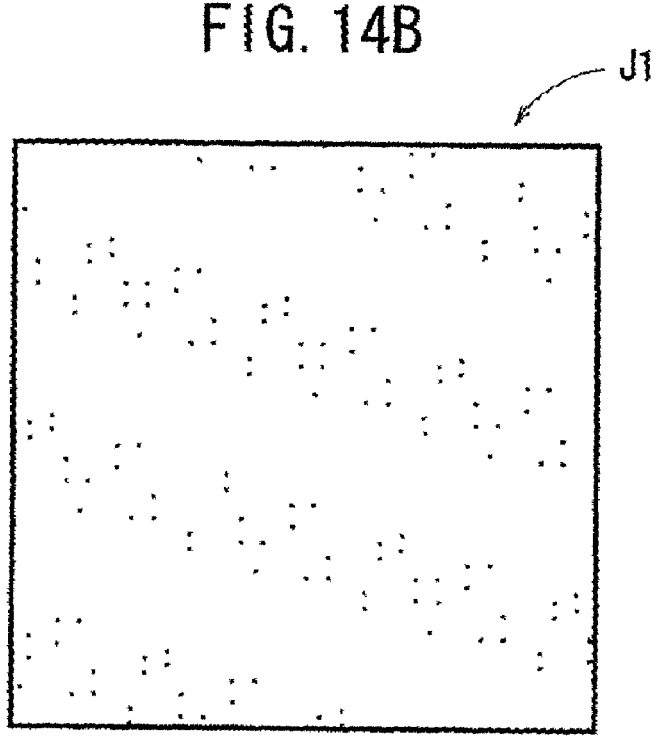
FIG. 14B is a diagram showing blackening candidate pixels where the strongest low-frequency component is not strengthened.

FIG. 14B shows blackening candidate pixel data J1 which has been left by the blackening candidate pixel excluding process in steps S12, S13 and whose frequency component intensity is small. The blackening candidate pixel data J1 is data which is left when blackening candidate pixels corresponding to the regions of the strong intensity (shown black in FIG. 14A) are removed from the blackening candidate pixel data J in the combination of the blackening candidate pixel data J shown in FIG. 13B and the frequency component data L1 corresponding to the particular frequency component f2 shown in FIG. 14A. Stated otherwise, the blackening candidate pixel data J1 is data represented by blackening candidate pixels left in the regions corresponding to the regions of the weak intensity (shown white in FIG. 14A).

In the frequency component data L1 corresponding to the particular frequency component (basic frequency component) f2 shown in FIG. 14A, there appear bright and dark regions over about three periods from the lower left side to the upper left side, and a signal A representing such bright and dark regions can be expressed by $A = a \cdot \sin(2\pi f2 \cdot r) + b$ (a represents the amplitude, $\pi$ the circle ratio, r the distance, and b an offset value). The signal A has a maximum value (a+b) (a value on the central line of each of black strip region) and a minimum value (−a+b) (a value on the central line of each of white strip region). The strong intensity of a particular frequency component means that the intensity is greater than the offset value b, and the weak intensity of a particular frequency component means that the intensity is smaller than the offset value b. Therefore, if a pixel having a weak frequency component (indicated as a dot in FIG. 14B) is blackened, then the original particular frequency component (basic frequency component) is considered as being weakened. In each of FIGS. 13A through 17A, the maximum value of the original particular frequency component (basic frequency component) is indicated as black, and the minimum value thereof as white.

If the number of candidate pixels of the remaining blackening candidate pixel data J1 is greater than the number Ndot of pixels per gradation, i.e., if the answer to step S14 is negative, then step S11 is carried out to narrow down blackening candidate pixels using the frequency component data L2 (FIG. 15A) in the actual space which has been converted from the particular frequency component F4 (intensity Pd) and which has the second strongest frequency component intensity.

Figure 15A:
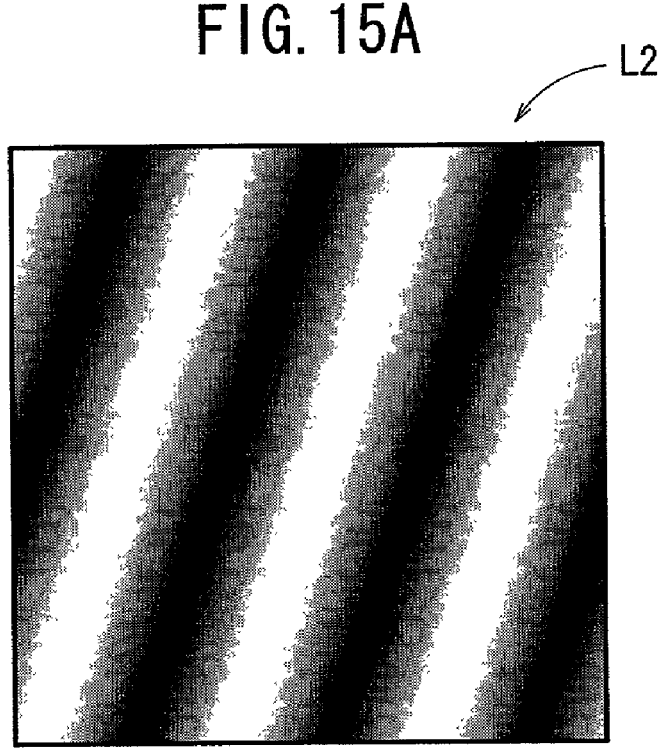
FIG. 15A is a diagram showing an image based on the second strongest low-frequency component.
Figure 15B:
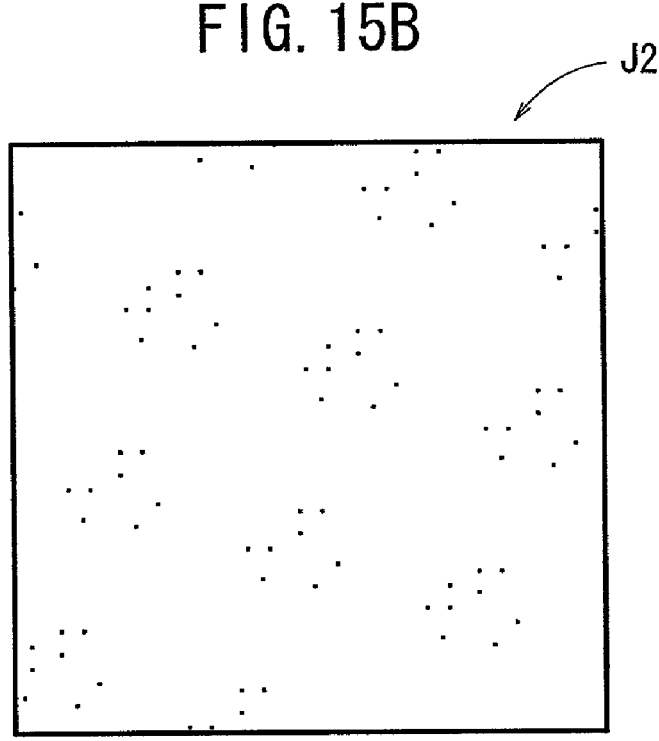
FIG. 15B is a diagram showing blackening candidate pixels where the second strongest low-frequency component is not strengthened.

FIG. 15B shows blackening candidate pixel data J2 which has been left by the blackening candidate pixel excluding process in steps S12, S13, performed second time, and whose frequency component intensity is small. The positions of thresholds corresponding to the blackening candidate pixel data J2 are blackening candidate positions of at least two components, i.e., the particular frequency component f2 and particular frequency component f4 whose intensities are weak, among the particular frequency component data B divided in step S9.

The blackening candidate pixel data J2 is data represented by remaining blackening candidate pixels in the regions corresponding to white regions in FIG. 15A in the combination of the blackening candidate pixel data J1 shown in FIG. 14B and the frequency component data L2 shown in FIG. 15A.

Figure 16A:
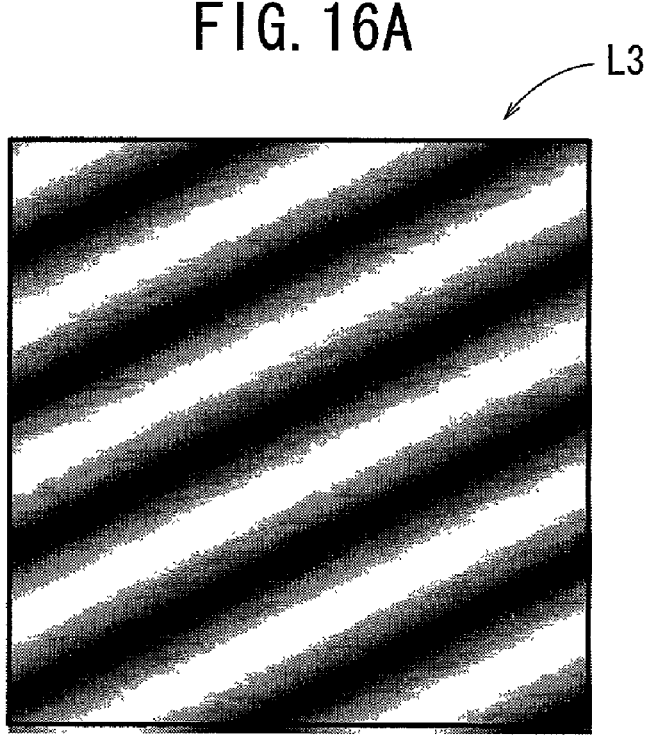
FIG. 16A is a diagram showing an image based on the third strongest low-frequency component.
Figure 16B:
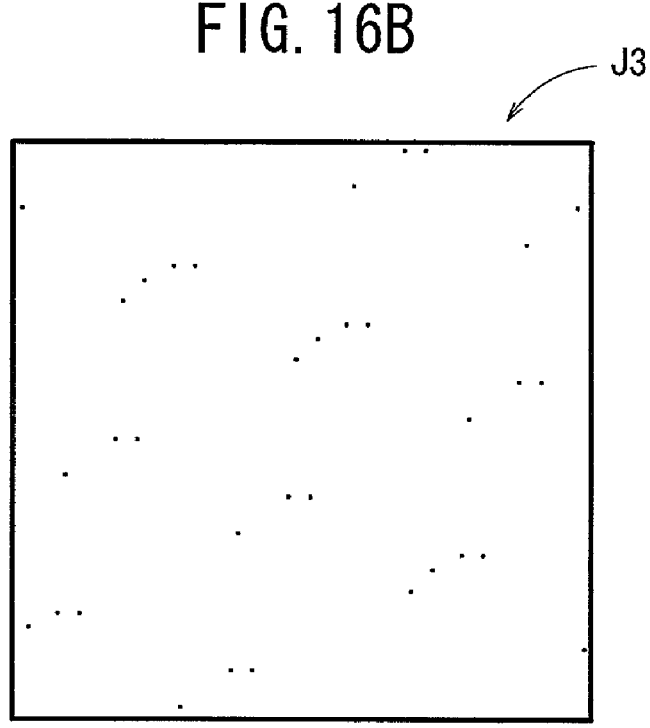
FIG. 16B is a diagram showing blackening candidate pixels where the third strongest low-frequency component is not strengthened.
Figure 17A:
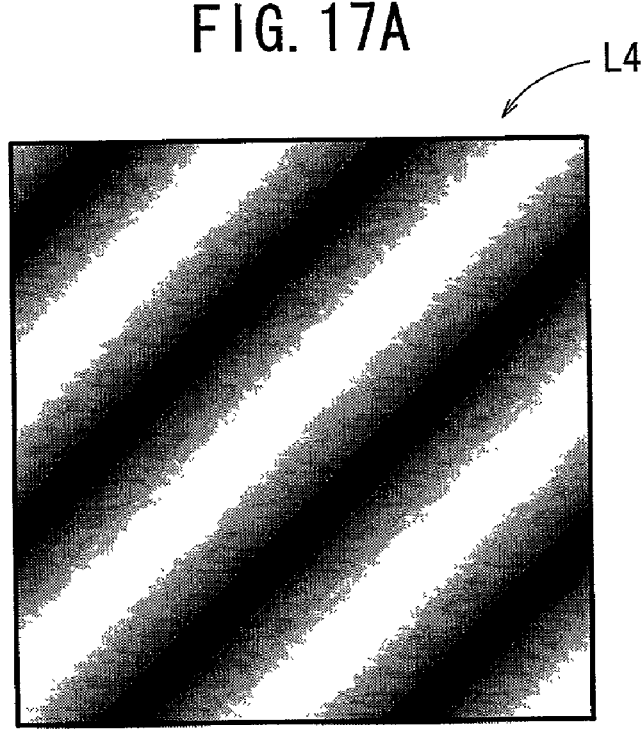
FIG. 17A is a diagram showing an image based on the fourth strongest low-frequency component.
Figure 17B:
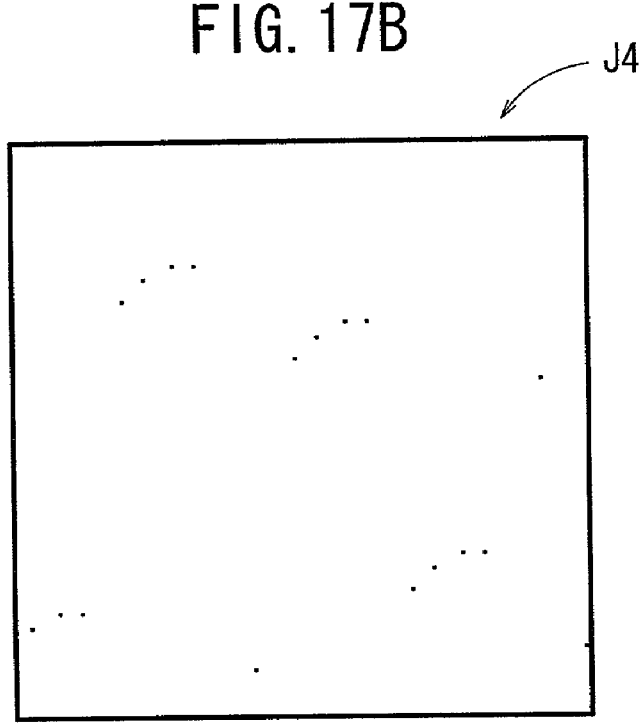
FIG. 17B is a diagram showing blackening candidate pixels where the fourth strongest low-frequency component is not strengthened.

Frequency component data L3, L4 in the actual space which have the third and fourth strongest frequency component intensities are shown in FIGS. 16A and 17A, respectively. FIGS. 16B and 17B show blackening candidate pixel data J3, J4, respectively, which have been left by the blackening candidate pixel excluding process in steps S12, S13 and whose frequency component intensities are small.

The positions of as many blackening candidate pixels, thus left, as the number Ndot of pixels per gradation are determined as the positions of thresholds for the next gradation.

If the answer to step S14 is affirmative, i.e., if thresholds corresponding to all the blackening pixels as many as the number Ndot of pixels per gradation are determined, the pixel determining processor 46 determines in step S15 whether a threshold array up to the maximum threshold T=255 has been determined or not. If a threshold array has not been determined, then steps S5 through S15 are repeated until a threshold array up to the maximum threshold T=255 is determined. Then, the process shown in FIG. 3 is finished.

By thus determining a threshold array, a finally left blackening candidate pixel that is a pixel which does not intensify the frequency components of the original dot pattern can be selected as a next blackening pixel. In view of the weakening of the frequency component with respect to only the basic frequency having the maximum amplitude, the position of the minimum value of the particular frequency component (basic frequency component) having the maximum amplitude is selected as the position of a next blackening candidate pixel. At this time, the particular frequency component (basic frequency component) having the second largest amplitude may be intensified. According to the algorithm described above, however, a next blackening pixel may be located in an optimum position which does not intensify, but weakens, any of the basic frequency components having relatively large intensities.

Figure 3:
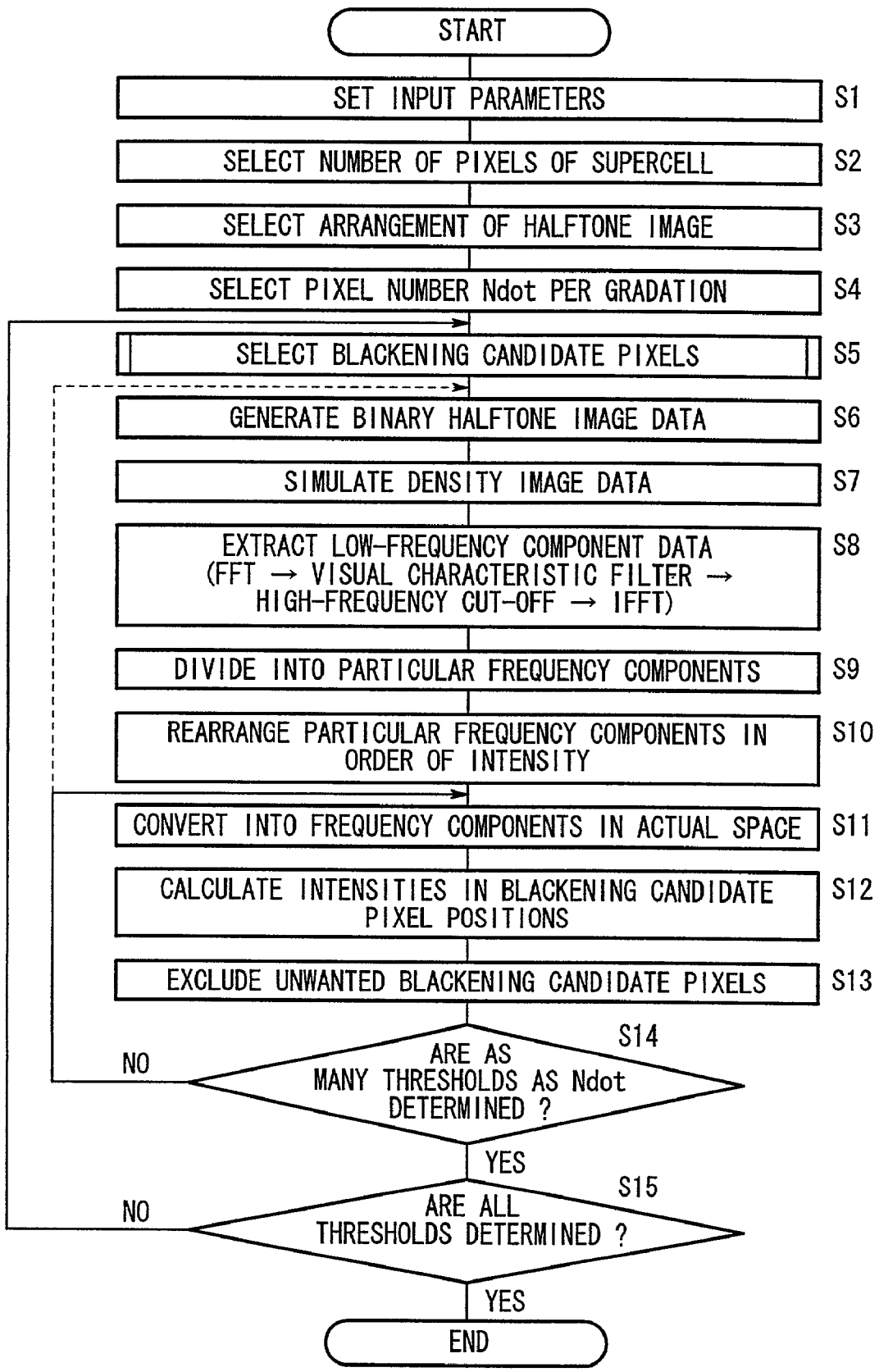
FIG. 3 is a flowchart of a process of determining a threshold array.

For determining the positions of as many thresholds as the number Ndot of pixels for a certain gradation, one or plural positions may be determined at a time in order to make the screen shape preferable, or as square as possible, and steps S6, S7, S8, S9, S10, S11, S12, S13, and S14, including the broken-line flow, shown in FIG. 3, are repeated.

Even if the thresholds for one or Ndot pixels are to be selected, when the algorithm shown in FIG. 3 is carried out, more pixels than actually desired may be left or the number of candidate pixels may be smaller than a target number after step S13. If more pixels than actually desired are left, then candidate pixels may be selected in order under other conditions in step S14 to achieve a desired number of candidate pixels. The order under the other conditions may be decreasing order of the sums of the intensities of divided frequency components at each pixel or order of distances D representative of a shape, for example. If the number of candidate pixels is smaller than a target number, then control goes back to a step preceding step S13 to increase the number of candidate pixels, and the above process for many pixels is carried out to obtain a desired number of candidate pixels.

The supercell threshold template 36M which is being generated with the entire threshold array being determined is handled as the supercell threshold template 36. The data of the supercell threshold template 36 is recorded in the storage medium 49, and then copied from the storage medium 49 to the supercell threshold template 36 in the platemaking system 10 shown in FIG. 1.

Similarly, when new input parameters (a screen ruling, a screen angle, an output resolution, a screen shape, etc.) are set in step S1, the threshold array of a supercell threshold template 36 corresponding to those new input parameters can be determined substantially automatically.

For printing a color image, it is necessary to produce the plates of four colors, i.e., C (cyan), M (magenta), Y (yellow), and K (black). Therefore, the threshold arrays of supercell threshold templates 36 for the plates of four colors at different angles (usually 0° (e.g., Y), 15° (e.g., C), 45° (e.g., M), and 75° (e.g., K) are generated according to the above algorithm.

In the above embodiment, the binary halftone image data H are processed. However, the principles of the present invention are not limited to the binary halftone image data H, but are also applicable to multi-valued halftone image data such as four-valued halftone image data having output values "0, 1, 2, 3", eight-valued halftone image data, etc.

For determining a threshold array according to the sequence shown in FIG. 3, blackening pixels (threshold array) are determined in increasing order from the threshold T=1 or a screen % of 0% (smallest %). However, blackening pixels may be determined in decreasing order from the maximum threshold T or a screen % of 100% (largest %).

FIG. 18 shows a threshold array determining sequence table 120. As shown in FIG. 18, according to a determining pattern 1, thresholds are determined in increasing order from 0% to 100%. According to a determining pattern 2, thresholds are determined in decreasing order from 100% to 0%. According to a determining pattern 3, thresholds are determined alternately in increasing order from 0% to 50% and decreasing order from 100% to 50%, i.e., in the order of 0%, 100%, 1%, 99%, . . .

According to a determining pattern 4, thresholds are determined alternately in increasing order and decreasing order from a certain gradation marked with X (gradation X) where a dot pattern (blackening pattern) free of moiré is produced, or specifically in the order of gradation X−1, gradation X+1, gradation X−2, gradation X+2, According to a determining pattern 5, thresholds are determined alternately in the order of gradation X−1, gradation 0%, gradation X+1, gradation 100%, gradation X−2, gradation 1%, gradation X+2, gradation 99%, where a dot pattern free of moiré is produced at the gradation X.

When candidate pixels are to be determined in decreasing order, not blackening candidate pixels are determined, but whitening candidate pixels, i.e., candidate pixels to be whitened next, are determined.

The platemaking system 10 shown in FIG. 1 where the supercell threshold template 36 thus generated is set is capable of producing a film F which is a recording medium carrying an image substantially free of moiré even under the output conditions where the resolution is 1200 dpi and the screen ruling is 175 lpi, or generally, under the output condition where the ratio of the output resolution (dpi) to the screen ruling (lpi) is 10 or smaller.

Figure 19:
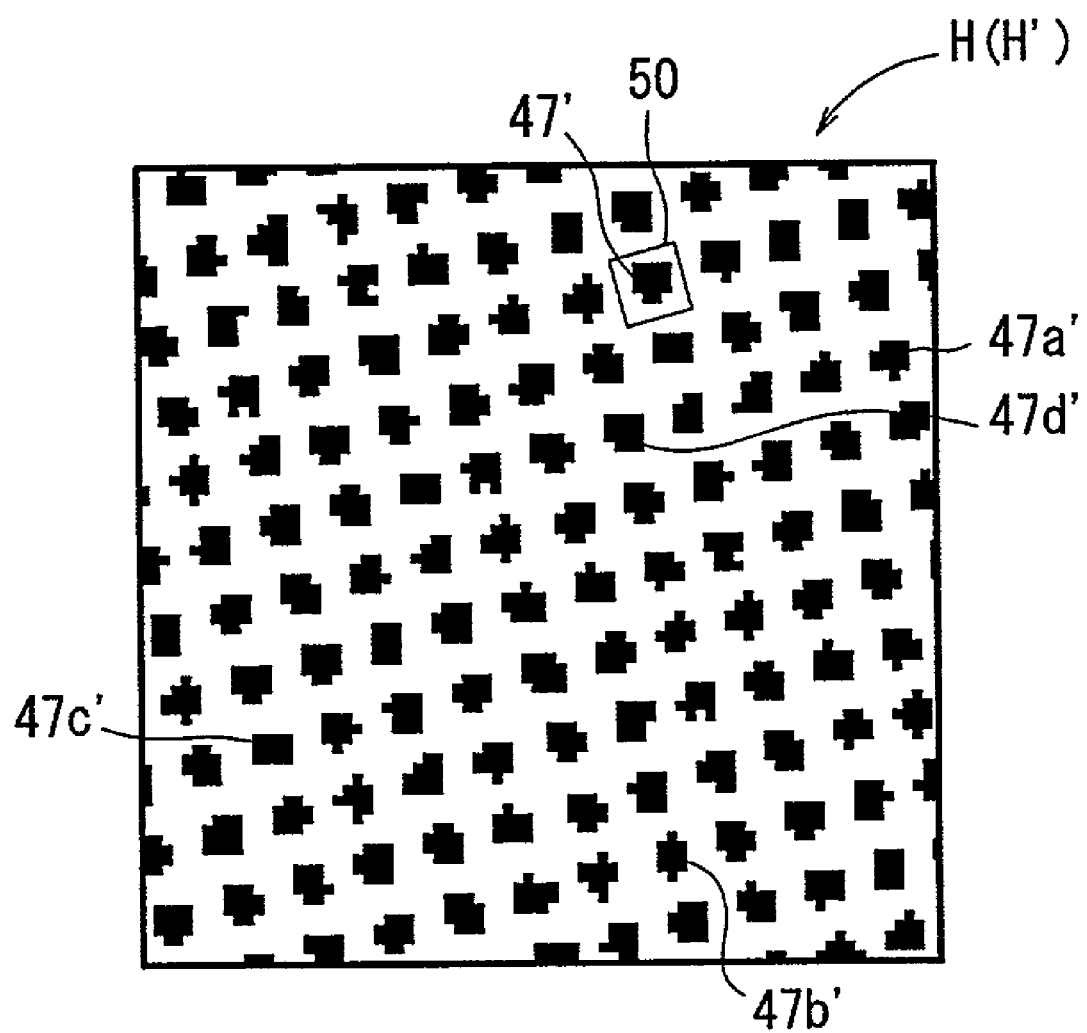
FIG. 19 is a diagram showing an image in a position space which is represented by halftone image data where blackened pixels are corrected in position.

FIG. 19 shows halftone image data H (H←H') generated by the halftone image data generator 20 where the supercell threshold template 36 whose threshold array has been determined is set as described above. The halftone image data H' is displayed at an enlarged scale on the display unit 35. The output resolution is 1200 dpi and the screen ruling is 175 lpi. The ratio dpi/lpi of the output resolution to the screen ruling is 6.86 ($\leq 10$).

Figure 20:
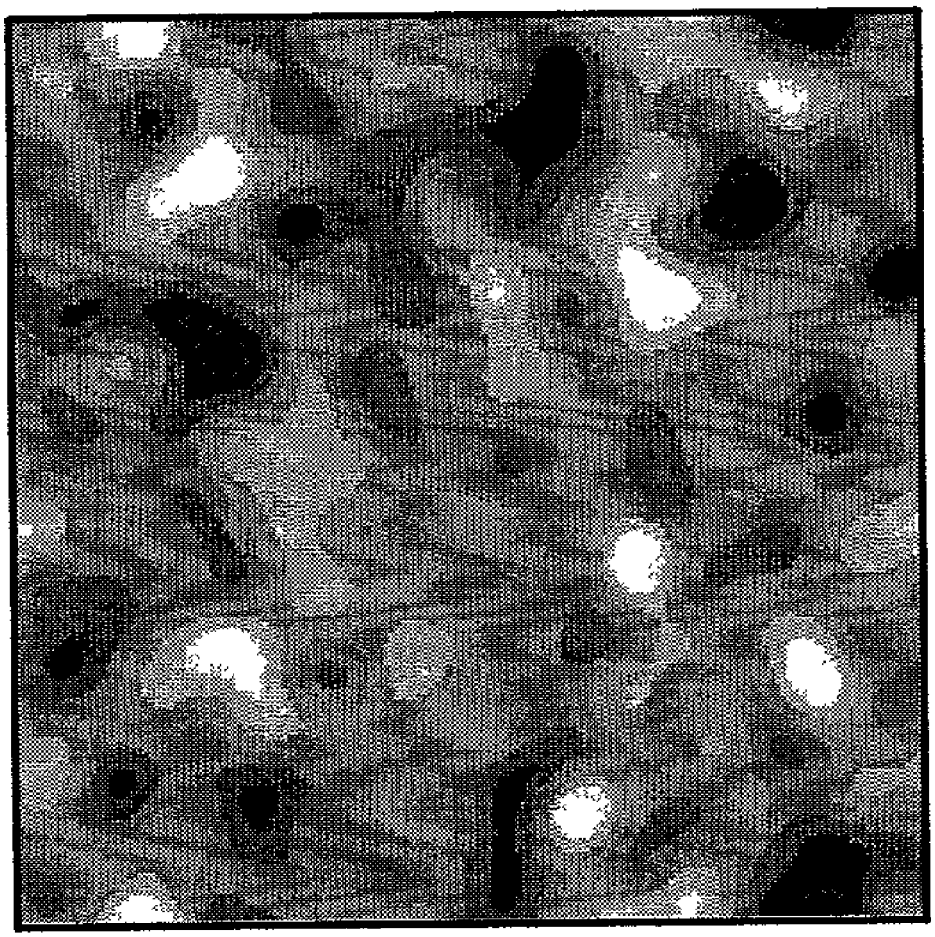
FIG. 20 is a diagram showing an image based on low-frequency components after a moiré component has been suppressed.

FIG. 20 shows low-frequency component data L (L←L') which is produced when the halftone image data H' is processed by the density simulator 33, the low-frequency component extractor 45, and the visual characteristics 65. The low-frequency component data L' is displayed at an enlarged scale on the display unit 35.

It can be seen that in the halftone image data H' shown in FIG. 19, a dot 47' in a dot cell 50 is changed to a dot 47 of the halftone image data H generated by the conventional process as shown in FIG. 7.

It can be understood that a moiré component (single-plate moiré component) visible with the low-frequency component data L shown in FIG. 10F is not visible with the low-frequency component data L' based on the halftone image data H'.

The numbers of blackening pixels of the dots 47, 47a, 47b, 47c, 47d of the dot cells 50 of the halftone image data H shown in FIG. 7 are 13, 12, 13, 12, 13, respectively, and the numbers of blackening pixels of the corresponding dots 47', 47a', 47b', 47c', 47d' of the dot cells 50 of the halftone image data H' shown in FIG. 19 are 14, 12, 11, 12, 15, respectively.

According to the above embodiment, the differences between the numbers of the blackening pixels making up the dots are increased to prevent low-frequency noise (e.g., single-plate moiré) of the entire supercell from being generated.

Specifically, when a screen tint having a screen % of 50% or less is outputted, if the number of blackening pixels of each of the dots 47 of the dot cells 50 of the supercell, i.e., the halftone image data H', has a maximum value Nmax and a minimum value Nmin, then the difference $\Delta(=Nmax-Nmin)$ between the numbers of the blackening pixels of the dots 47 should preferably be in the range of $2 \leq \Delta \leq 6$. If the difference $\Delta$ exceeded 6, then it would be visually recognized as random noise. Therefore, the difference $\Delta$ should preferably be or less than 6 ($\Delta \leq 6$).

Actually, the difference $\Delta$ should preferably in the range of $2 \leq \Delta \leq 4$ if the ratio dpi/lpi of the output resolution to the screen ruling is in the range of dpi/lpi $\leq 10$.

When a screen tint having a screen % of 50% or larger is outputted, the number of whitening pixels as blank dots as well as the number of blackening pixels may be considered in the same manner as described above. At this time, the dot cells 50 comprise dot cells set in a range where blank pixels are accommodated unlike those for blackening pixels.

The difference $\Delta$ (the difference between the numbers of blackening pixels or the difference between the numbers of whitening pixels) is applied to screen % in the vicinity of 25% and 75%. If the number of blackening pixels or whitening pixels making up dots 47 in the dot cells 50 is one through three, then it is preferable that the numbers of blackening pixels or whitening pixels making up dots 47 should be the same as each other or any difference $\Delta$ therebetween should be $\Delta \leq 1$. Irregularities due to different numbers of pixels rather than single-plate moiré may be visually recognizable. If the screen % is near 50%, then since adjacent dots 47 are held in contact with each other, it is meaningless to determine which pixel belongs to which dot 47.

The process described in the above embodiment is applicable even if the low-frequency component moiré is not clear. If it is known that a component of a predetermined moiré frequency is generated or can be calculated in a halftone image, then when unnecessary blackening candidate pixels are excluded in step S13, candidate pixels which intensify the known particular frequency component are initially excluded, and then candidate pixels are determined. In this manner, candidate pixels can be determined in a shorter period of time.

For example, a moiré component produced in an image having the output resolution of 1200 dpi, the screen ruling of 175 lpi, and the screen angle of 15° will be calculated.

Figure 21:
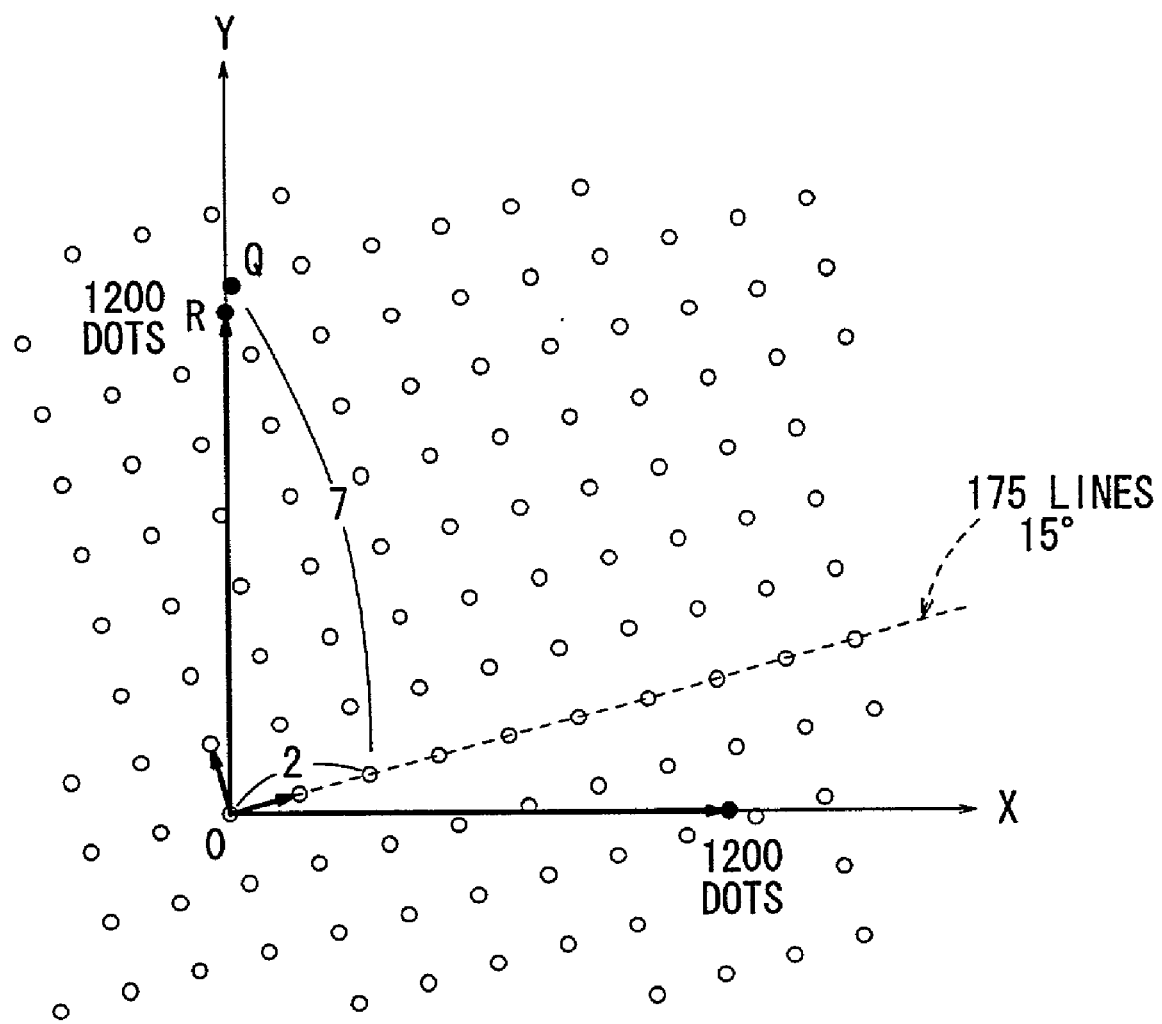
FIG. 21 is a frequency vector diagram of an output resolution and a screen ruling.

FIG. 21 is a frequency vector diagram of an output resolution and a screen ruling. In FIG. 21, circles indicate frequency components which a halftone image having the screen ruling of 175 lpi and the screen angle of 15°, showing dot frequency grid components representing the dot basic frequency and its harmonic components. In FIG. 21, the component of the output resolution of 1200 dpi can be indicated by the coordinate position R (x, y)=(0, 1200) on the Y-axis.

Generally, a moiré pattern produced by two frequency components can be represented by the difference between the frequency vectors. A low-frequency moiré component which is visually problematic is caused by selecting grid point coordinates Q (m, n) in a dot grid which are closest to the coordinate position R representing the output resolution. The grid point coordinates Q (m, n) are indicated by Q (m, n)=(2, 7) by solving the following integral value problem (4):

$$m \times 175 \sin 15° + n \times 175 \cos 15° = 1200 \quad (4)$$

The coordinates Q (x, y) in an XY coordinate system which correspond to the grid point coordinates Q (m, n) are given as Q (x, y)=(21, 1274) because y=2×175 sin 15°+7×175 cos 15°=1274, x=2×175 cos 15°−7×175 sin 15°=21.

Figure 22:
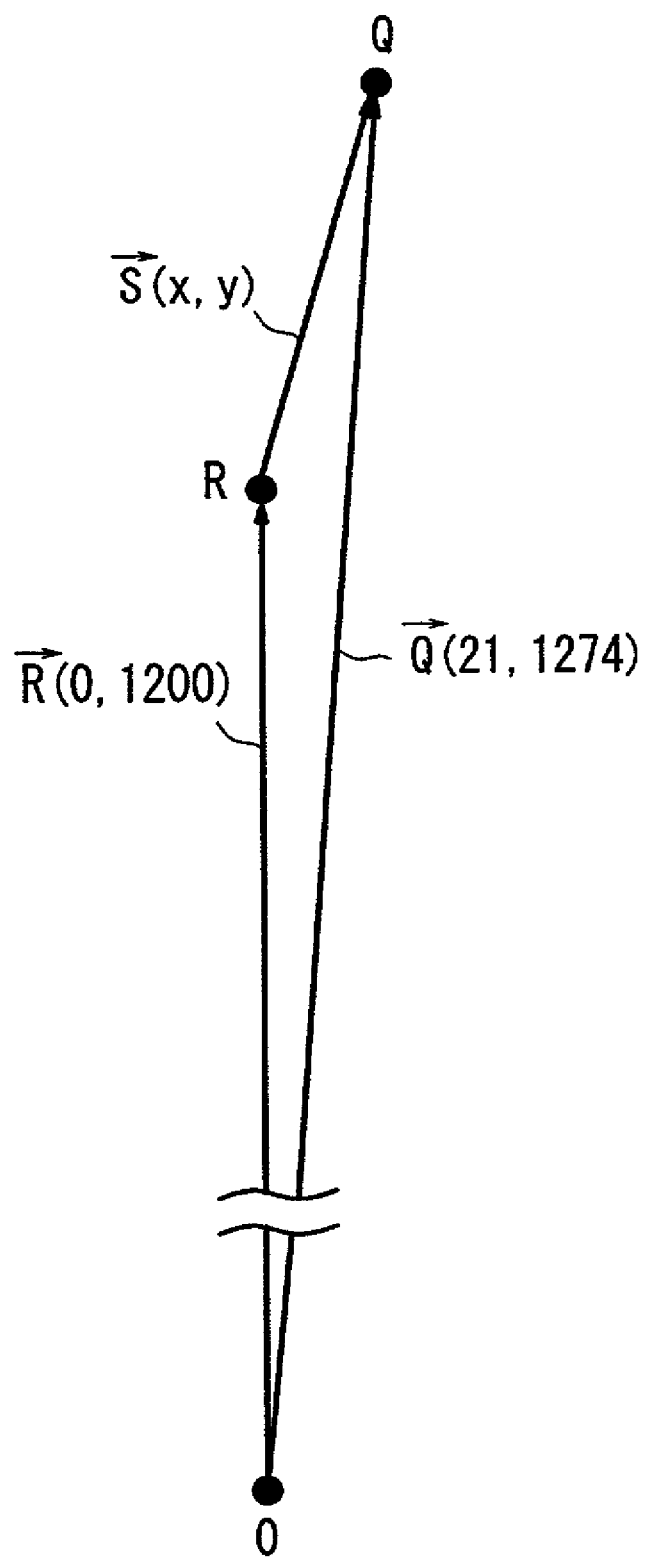
FIG. 22 is an enlarged diagram of a portion of the diagram of FIG. 21.

As shown at an enlarged scale in FIG. 22, the differential vector S (x, y) between a vector R and a vector Q whose starting points are located at the origin of the XY coordinate system has components (21, 74). The differential vector S (x, y) serves as an interference component interfering with harmonic components of the grid point coordinates Q (m, n) and the component of the output resolution of 1200 dpi, serving as a moiré component having a magnitude of $(21^2+74^2)^{1/2}$ dpi and an angle of tan θ=(74/21).

Specifically, it can be seen based on calculations that a moiré component having a magnitude of about 77 dpi (about 0.3 mm) and an angle θ=about 74° is produced.

If a moiré component which can be predicted as being generated based on calculations is initially excluded from blackening candidate pixels in step S13, then the number calculations required in the fast Fourier transform and the inverse fast Fourier transform when steps S11 through S14 are repeated is reduced, allowing the positions of optimum blackening candidate pixels to be determined in a shorter period of time.

In the above embodiment, a process of determining the positions of thresholds in a method of reproducing a gradation image using a threshold array has been described above. The present invention serves to successively determine which dot arrangement is an optimum arrangement in each gradation. As can easily be understood by those skilled in the art, a dot arrangement in each gradation which is determined as described above is applicable to another gradation reproducing technique such as a density pattern method in which one pixel of a gray-scale image is associated with a submatrix of Z×Z dots and the density of each pixel is reproduced by the area ratio of blackening dots in the submatrix.

As described above, the present invention serves to successively determine which dot arrangement is an optimum arrangement in each gradation. In the above embodiment, dots according to an AM screen, in which dots having substantially uniform sizes are arranged at substantially equal intervals in rows and columns perpendicular thereto, representing the gray scale with the sizes of dots have been described. Depending on the conditions for selecting candidate pixels with the candidate pixel selector 41 shown in FIG. 2, the present invention is also applicable to the reduction of a low-frequency component generated in relation to a threshold array in an FM screen in which dots are irregularly arranged and the gray scale is represented by the density of dots.

If an FM screen is employed, then the LPF 42 may comprise a filter according to only the human visual characteristics 65, and any filtering according to a low-pass filter corresponding to the screen ruling at the dot period is not required.

According to the present invention, as described above, it is possible to determine a threshold array for minimizing periodic patterns and low-frequency components such as moiré.

Although a certain preferred embodiment of the present invention has been shown and described in detail, it should be understood that various changes and modifications may be made therein without departing from the scope of the appended claims.

What is claimed is:

1. A method of determining a threshold array for generating a gradation image, comprising the steps of:
   when the positions of thresholds up to a given gradation have been determined in a threshold array and the position of one or more thresholds of the same value for a next gradation is to be determined;
   (A) determining one or more candidate positions for the position of one or more thresholds of the same value for the next gradation; and
   (B) determining the position of a threshold for the next gradation among said candidate positions;
   said step (B) comprising the steps of:
   (1) determining a particular frequency component of image data obtained based on a threshold array in which the positions of thresholds up to the given gradation have been determined;
   (2) determining the intensity of said particular frequency component in each of the candidate positions;
   (3) determining a candidate position in which the determined intensity of said particular frequency component is weak as the position of the threshold for the next gradation; and
   repeating said steps (1), (2), and (3) until all the positions of the thresholds of the same value for the next gradation are determined.

2. A method according to claim 1, wherein said threshold array is applied to the generation of halftone image data in which the ratio of dpi/lpi is selected to be 10 or smaller where dpi (dots per inch) represents the resolution of the halftone image data to be generated by the threshold array and lpi (lines per inch) represents the ruling of said threshold array.

3. A method of determining a threshold array for generating a gradation image, comprising the steps of:
   when the positions of thresholds up to a given gradation have been determined in a threshold array and the position of one or more thresholds of the same value for a next gradation is to be determined;

(A) determining one or more candidate positions for the position of one or more thresholds of the same value for the next gradation; and (B) determining the position of a threshold for the next gradation among said candidate positions;

said step (B) comprising the steps of:

(1) extracting a low-frequency component from image data obtained based on a threshold array in which the positions of thresholds up to the given gradation have been determined;

(2) dividing the extracted low-frequency component into at least one frequency component;

(3) determining the intensity of said frequency component in each of the candidate positions;

(4) determining a candidate position in which the determined intensity of said frequency component is weak as the position of the threshold for the next gradation; and repeating said steps (1), (2), (3), and (4) until all the positions of the thresholds of the same value for the next gradation are determined.

4. A method according to claim 3, wherein said step (1) of extracting a low-frequency component comprises the steps of:

converting said image data into density image data which predicts an image to be reproduced on a recording medium by way of calculations; and extracting said low-frequency component from said density image data.

5. A method according to claim 3, wherein the position of the threshold determined in said step (4) is used as a candidate position in which the intensities of at least two divided frequency components are weak.

6. A method according to claim 3, wherein said step (1) of extracting a low-frequency component from image data comprises the step of:

weighting the image data according to human visual characteristics; and extracting the low-frequency component from the image data.

7. A method according to claim 3, wherein said threshold array is applied to the generation of halftone image data in which the ratio of dpi/lpi is selected to be 10 or smaller where dpi (dots per inch) represents the resolution of the halftone image data to be generated by the threshold array and lpi (lines per inch) represents the ruling of said threshold array.

* * * * *